United States Patent
Abend et al.

(10) Patent No.: US 7,621,125 B2
(45) Date of Patent: Nov. 24, 2009

(54) AXLE DRIVING SYSTEM

(75) Inventors: Robert Abend, Adairsville, GA (US);
Hideaki Okada, Hyogo-ken (JP); Ryota Ohashi, Hyogo-ken (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 99 days.

(21) Appl. No.: 12/029,988

(22) Filed: Feb. 12, 2008

(65) Prior Publication Data
US 2008/0129108 A1 Jun. 5, 2008

Related U.S. Application Data

(63) Continuation of application No. 11/756,346, filed on May 31, 2007, now Pat. No. 7,340,891, which is a continuation of application No. 11/553,808, filed on Oct. 27, 2006, now Pat. No. 7,225,618, which is a continuation of application No. 11/295,430, filed on Dec. 7, 2005, now Pat. No. 7,127,890, which is a continuation of application No. 10/800,638, filed on Mar. 16, 2004, now Pat. No. 6,990,808, which is a continuation of application No. 10/101,112, filed on Mar. 20, 2002, now Pat. No. 6,715,283, which is a continuation of application No. 09/381,235, filed as application No. PCT/US97/03809 on Mar. 12, 1997, now Pat. No. 6,449,949.

(51) Int. Cl.
*F16D 39/00* (2006.01)
(52) U.S. Cl. .............................. 60/487; 91/505; 92/12.2
(58) Field of Classification Search .................. 60/487; 91/505; 92/12.2
See application file for complete search history.

(56) References Cited

U.S. PATENT DOCUMENTS

| | | | |
|---|---|---|---|
| 4,893,524 A | 1/1990 | Ohashi et al. |
| 4,905,472 A | 3/1990 | Okada |
| 4,922,787 A | 5/1990 | Fujisaki et al. |
| 4,932,209 A | 6/1990 | Okada et al. |
| 4,942,780 A | 7/1990 | Fujisaki et al. |
| 5,090,949 A | 2/1992 | Thoma et al. |
| 5,094,077 A | 3/1992 | Okada |
| 5,163,293 A | 11/1992 | Azuma et al. |

(Continued)

*Primary Examiner*—Igor Kershteyn
(74) *Attorney, Agent, or Firm*—Sterne, Kessler, Goldstein & Fox P.L.L.C.

(57) ABSTRACT

An axle driving system which houses in a housing thereof a hydrostatic transmission, axles, and a driving gear train for connecting output means of the hydraulic transmission and axles, so as to transmit power from a driving source to the hydrostatic transmission and to change the speed, thereby driving the axles. A first chamber therein contains the hydrostatic transmission and a second chamber therein contains the driving gear train. Both the first and second chambers are independent of each other so as to prevent a foreign object, such as iron powder produced in the driving gear train, from entering the hydrostatic transmission. The system includes an L-like-shaped center section on which the hydrostatic transmission is offset such that an imaginary plane which includes a motor mounting surface passes in proximity to the axis of a pump shaft. The pump shaft is disposed perpendicular to the axles. The motor shaft is disposed in parallel thereto. A hydraulic pump is positioned between the hydraulic motor and the axles, so that the housing for the hydrostatic transmission, axles and driving gear train, is smaller in width to thereby make the system more compact.

3 Claims, 23 Drawing Sheets

U.S. PATENT DOCUMENTS

| | | |
|---|---|---|
| 5,201,692 A | 4/1993 | Johnson et al. |
| 5,317,936 A | 6/1994 | Shiba et al. |
| 5,335,496 A | 8/1994 | Azuma et al. |
| 5,412,947 A | 5/1995 | Hirose |
| 5,456,068 A | 10/1995 | Ishil et al. |
| 5,501,640 A | 3/1996 | Hauser et al. |
| 5,528,958 A | 6/1996 | Hauser |
| 5,544,547 A * | 8/1996 | Ishimaru .................... 74/730.1 |
| 5,647,249 A | 7/1997 | Okada et al. |
| 5,655,417 A | 8/1997 | Okada et al. |
| 5,664,465 A | 9/1997 | Okada et al. |
| 5,697,264 A | 12/1997 | Andrews et al. |

* cited by examiner

AXLE DRIVING SYSTEM

CROSS-REFERENCE TO RELATED APPLICATIONS

The present application is a Continuation of application Ser. No. 11/756,346, filed May 31, 2007; which is a Continuation of application Ser. No. 11/553,808, filed Oct. 27, 2006, now U.S. Pat. No. 7,225,618; which is a Continuation of application Ser. No. 11/295,430, filed Dec. 7, 2005, now U.S. Pat. No. 7,127,890; which is a Continuation of application Ser. No. 10/800,638, filed Mar. 16, 2004, now U.S. Pat. No. 6,990,808; which is a Continuation of application Ser. No. 10/101,112, filed Mar. 20, 2002, now U.S. Pat. No. 6,715,283; which is a Continuation of application Ser. No. 09/381,235, having a 371(c) filing date of Oct. 27, 1999, now U.S. Pat. No. 6,449,949; which is a national stage application of WO Application No. PCT/US97/03809, filed Mar. 12, 1997, each of which is hereby incorporated in its entirety herein by reference thereto.

BACKGROUND OF THE INVENTION

1. Field of the Invention

The present invention relates to an axle driving system in which a hydrostatic transmission (hereinafter referred to as an "HST"), axles and a power transmitting mechanism are integrally provided in a housing, and more particularly to an axle driving system in which the width of the portion of the housing which houses the HST and power transmitting mechanism is smaller than in conventional systems.

2. Background Art

A conventional axle driving system houses the HST, axles and a driving gear train for interlocking the HST with the axles in a common housing. The HST is constructed so that a hydraulic pump is disposed on a horizontal portion of a center section which is L-like-shaped and a hydraulic-motor is disposed on the vertical portion of the same. The hydraulic motor is positioned to one side of the axle. The hydraulic pump and hydraulic motor are fluidly connected to each other by a closed fluid circuit formed in the center section. The hydraulic pump is driven by a prime mover provided on the vehicle so as to drive the hydraulic motor and then the axles through a driving gear train. Such a construction is disclosed, for example, in U.S. Pat. Nos. 5,163,293 and 5,335,496.

The hydraulic pump and hydraulic motor in the conventional technique, are disposed side-by-side and to one side of the axles. As such, the width of the HST is larger which results in the lateral width of the common housing for both the pump and motor also being larger. Furthermore, an output shaft of the hydraulic motor extends to one side of the vehicle to transmit power therefrom to a differential gear unit through gears of a driving gear train, so as to drive the axles. An unused space is formed at a side of the gear train and between the HST pump and the axles.

Further, when the HST and the driving gear train for driving the axles by the output shaft of the HST are housed in a common housing, a foreign object, such as iron powder produced by the driving gear train, may enter into the HST. This can adversely affect operation of the HST or various parts thereof.

BRIEF SUMMARY OF THE INVENTION

The axle driving system of the present invention is constructed so that the HST center section is formed in such a manner that the extended phantom plane of the motor mounting surface of the center section passes in the vicinity of the axis of the pump shaft of the hydraulic pump. The pump shaft extends substantially perpendicular to the axles. The motor shaft of the hydraulic motor extends substantially in parallel thereto. The hydraulic pump is disposed between the hydraulic motor and the axles. Hence, the width of the—housing is made smaller so as to be compact in size. The axle driving system, which is smaller in lateral width, is provided with a wide swinging space for the running wheels of the vehicle and is extremely effective for a vehicle having freely steerable wheels mounted thereon.

Further, the present invention divides the housing into two separate chambers for housing the HST and for housing a driving gear train and axles. A partition for dividing the two chambers is provided with an oil filter so that both chambers can be filled with common oil. This improves the durability of the HST and reduces the manufacturing cost.

The above and other related objects and features of the invention will be apparent from a reading of the following description of the preferred embodiments including the accompanying drawings and the appended claims.

BRIEF DESCRIPTION OF THE DRAWINGS/FIGURES

DETAILED DESCRIPTION OF THE INVENTION

Figure 1:
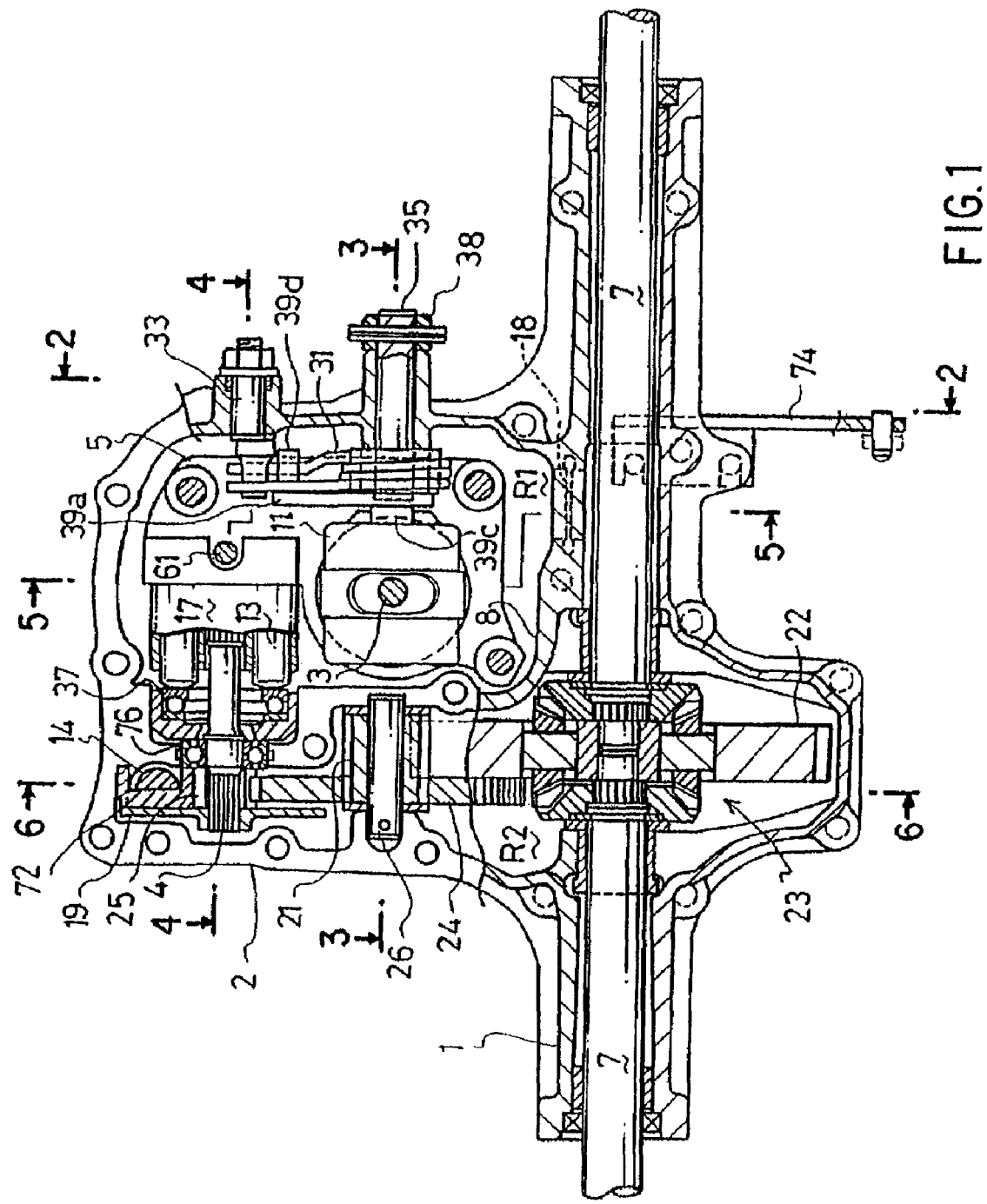
FIG. 1 is a partial cross-sectional plan view of a first embodiment of an axle driving system of the present invention, from which an upper half housing is removed.

Explanation will now be given on the entire construction of an axle driving system according to the present invention in which the housing thereof comprises an upper half housing 1 and a lower half housing 2 which are joined together along a horizontal, flat peripheral joint surface of each half housing. Along the joint surface of the upper and lower half housings is provided bearings for a motor shaft 4 and a counter shaft 26. Axles 7 are disposed in parallel to the joint surface of the housing. The bearings for axles 7 are shifted upwardly from the joint surface and are disposed in upper half housing 1 so as to rotatably support axles 7. Axles 7 are differentially coupled with a differential gear unit 23. Each axle 7 projects outwardly from one end of left and right side walls of the housing, respectively.

The interior of the housing is divided by an inner wall 8 into a first chamber R1 for housing therein an HST and a second chamber R2 for housing therein (1) a driving gear train comprising a plurality of gears for transmitting power from motor shaft 4 to differential gear unit 23, (2) differential gear unit 23, and (3) axles 7. Inner wall 8 comprises a longitudinal portion which is in—parallel to axles 7 and a perpendicular portion which extends at a right angle to the longitudinal portion of inner wall 8. Both portions of inner wall 8 are continuously provided so that first chamber R1 is disposed adjacent to second chamber R2. Inner wall 8 also comprises a vertical wall portion which extends downwardly from the interior of upper half housing 1 toward the joint surface of the housing and rising from the interior of second half housing 2 toward the same. The end surfaces of both the vertical wall portions of inner wall 8 abut against each other when both upper and lower half housings 1 and 2 are joined, thereby forming two divided, independent chambers within the housing.

Figure 5:
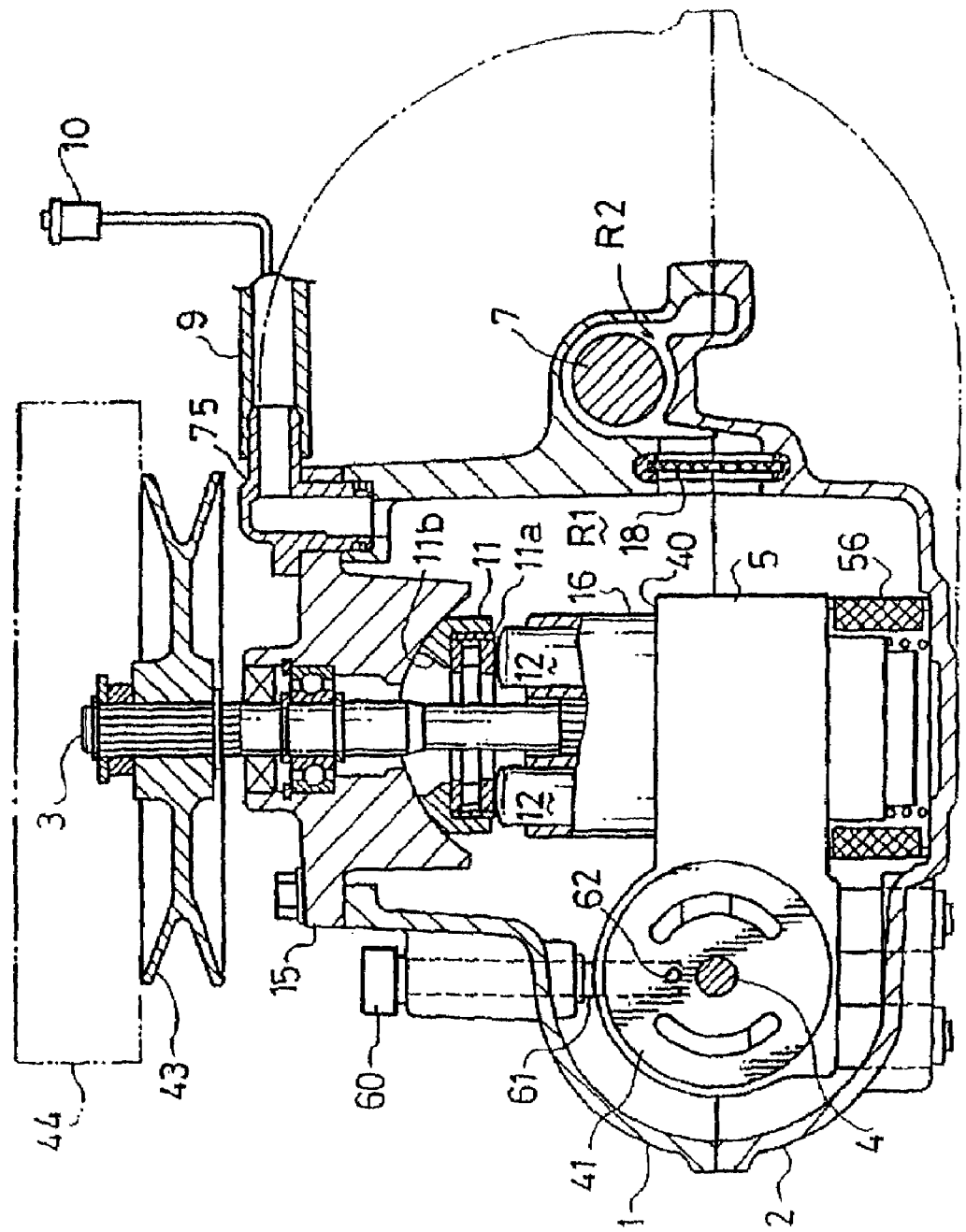
FIG. 5 is a cross-sectional view looking in the direction of the arrows 5-5 in FIG. 1.
Figure 6:
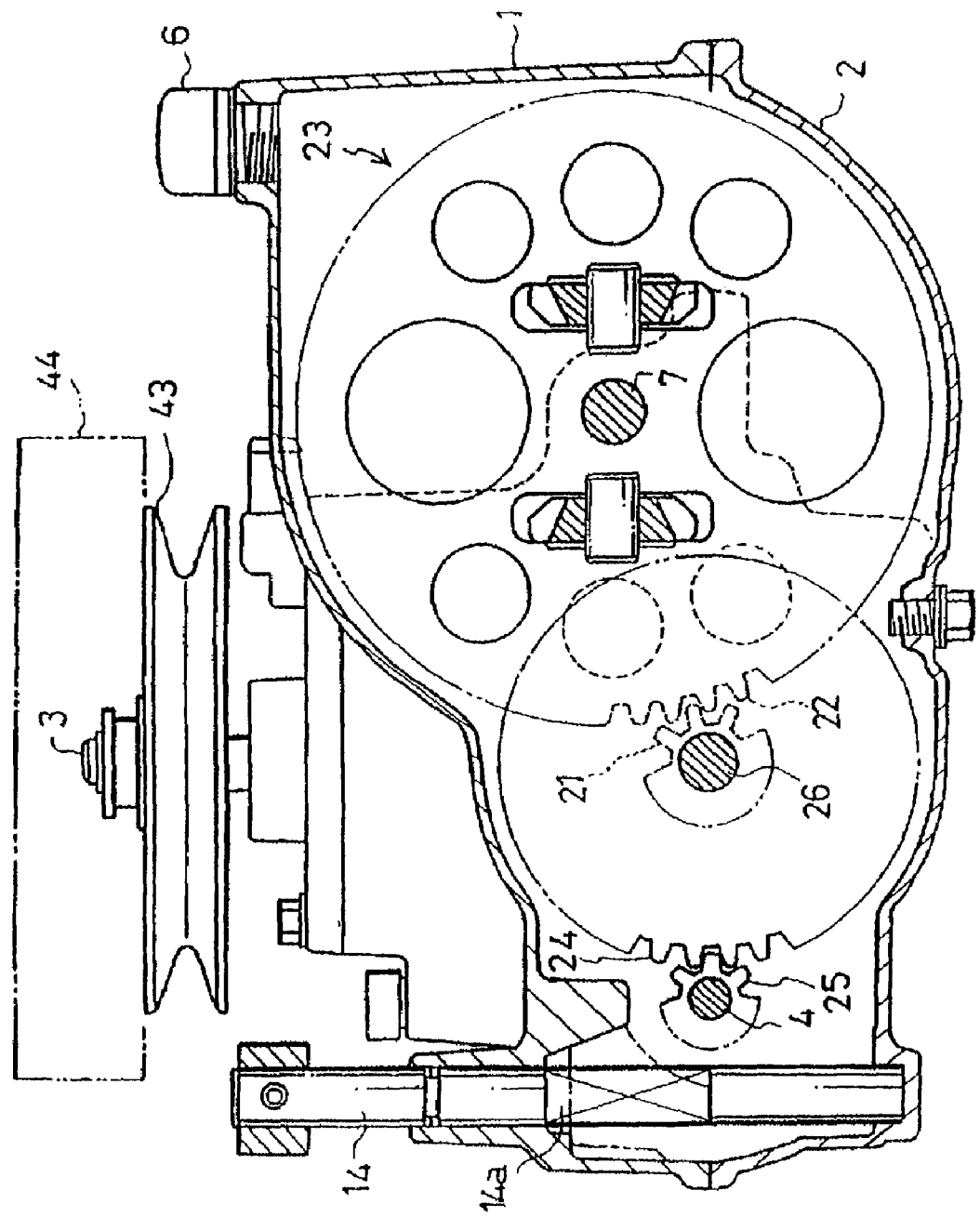
FIG. 6 is a cross-sectional view looking in the direction of the arrows 6-6 in FIG. 1.
Figure 7:
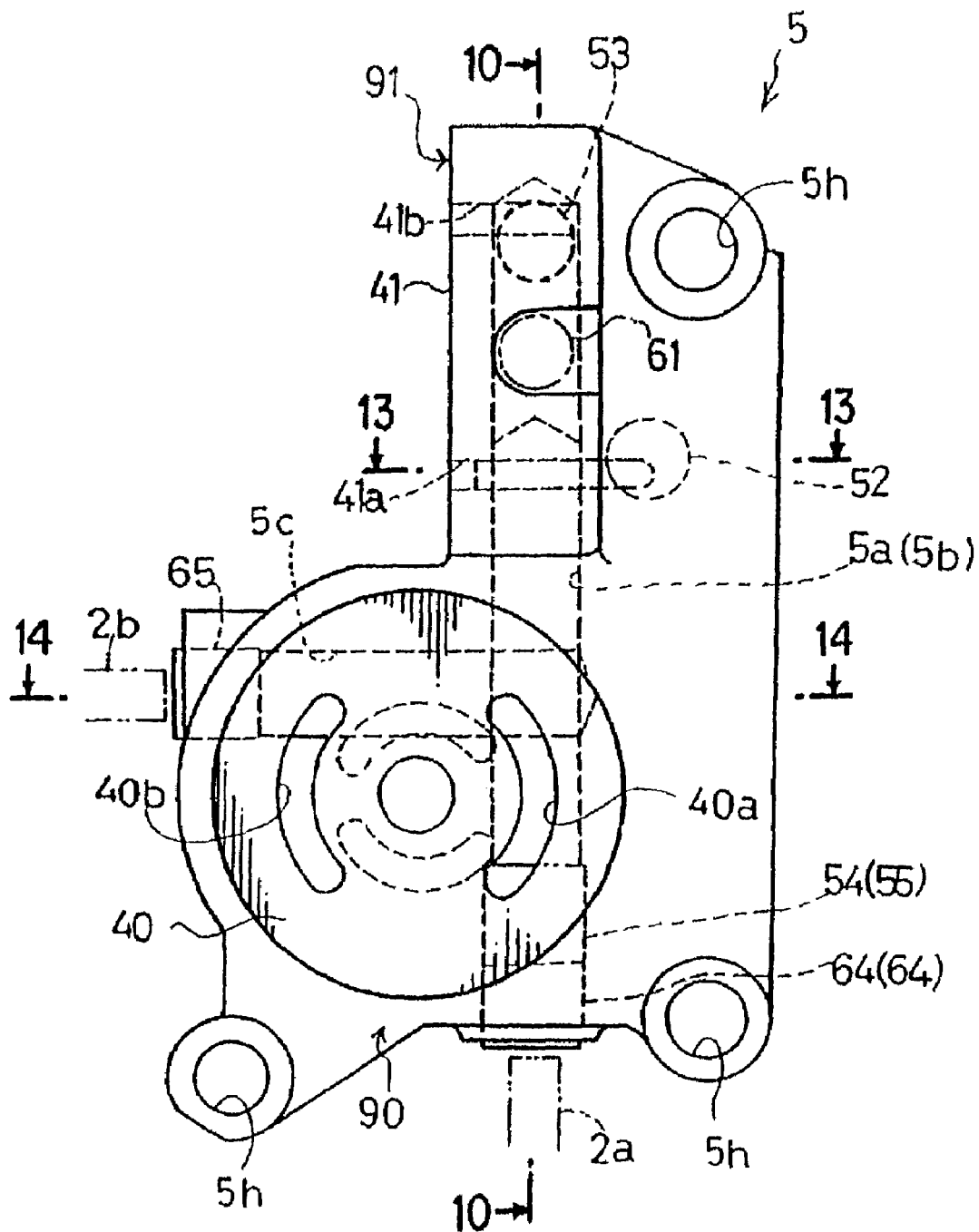
FIG. 7 is a top plan view of a center section of the present invention.

The first and second chambers R1 and R2 are filled with lubricating oil which is used in common therewith to form an oil sump. As shown in FIG. 6, an oiling lid 6 is provided on an upper wall of upper half housing 1 above differential gear unit 23 so as to enable operating oil to be supplied through lid 6. As shown in FIG. 5, an oil flow-through port 75 is mounted on a wall surface of upper half housing 1 constituting first chamber R1, so that first chamber R1 and an external reservoir tank 10 fluidly communicate with each other through a piping 9 made of a rubber hose or the like so as to enable operating oil in the oil sump to be maintained at a predetermined amount. The amount can be adjusted by flowing an incremental volume of oil into reservoir tank 10 when the temperature of the oil rises when the HST is driven.

An oil filter 18 is disposed on inner wall 8 which partitions first chamber R1 from second chamber R2. In a first embodiment, as shown in FIGS. 1 and 5, oil filter 18 is disposed at the joint surfaces of the vertical portions of inner wall 8 to house therein the HST and right side axle 7, thereby enabling oil to flow through oil filter 18 between first chamber R1 and second chamber R2. Accordingly, oil provided in the housing can be used in common as operating oil for the HST and as lubricating oil for the gears and bearings. Also, when oil flows from second chamber R2 into first chamber R1, harmful foreign objects such as iron powder, flowing into the HST is filtered by oil filter 18.

First chamber R1 is disposed in front of axles 7 and to the side of the geared transmission for transmitting power from motor shaft 4 to differential gear unit 23, provided in the housing. A center section 5 of the HST is mounted in first chamber R1 and is separate therefrom. Center section 5 is disposed in a manner such that its longitudinal direction is substantially perpendicular to axles 7. The front portion forms a vertical surface 91 on which a motor mounting surface 41 is formed on which a hydraulic motor is disposed. The rear portion forms a horizontal surface 90 on which a pump mounting surface 40 is formed on which a hydraulic pump is disposed. Accordingly, the hydraulic pump is disposed between the hydraulic motor and axles 7. A pump shaft 3 is supported vertically in the center of pump mounting surface 40 and is positioned between the hydraulic motor and axles 7.

The axial piston type hydraulic pump of the present invention includes a cylinder block 16 which is rotatably, slidably disposed on pump mounting surface 40 of center section 5. Pistons 12 are fitted into a plurality of cylinder bores and move in reciprocation through biasing springs. A movable swash plate 11 having a thrust bearing 11a abuts against the heads of pistons 12. At the center of movable swash plate 11 is formed an opening 11b through which pump shaft 3 perforates. Pump shaft 3 also serves as an input shaft and is disposed along the rotational axis of cylinder block 16 and is not relatively rotatably retained thereto. The upper end of pump shaft 3 projects outwardly from the upper wall of upper half housing 1 and fixedly supports an input pulley 43 having a cooling fan 44. Input pulley 43 is given power from a prime mover (not shown) of the vehicle to which the axle driving system is mounted through a belt transmission mechanism (also not shown).

The piston abutting surface of movable swash plate 11 is desirably slantingly movable from a horizontal state with respect to the rotational axis of cylinder block 16, thereby enabling the amount and direction of discharged oil from the hydraulic pump to be changed. The rear surface of movable swash plate 11 is convex and the inner surface of a lid member 15 fixed to upper half housing 1, which closes an opening in the upper wall, is made concave to match with the convex rear surface of movable swash plate 11. Movable swash plate 11 is constructed to be of a cradle type which, when slantingly moved, slides while coming into close contact with the concave surface of upper half housing 1.

Figure 2:
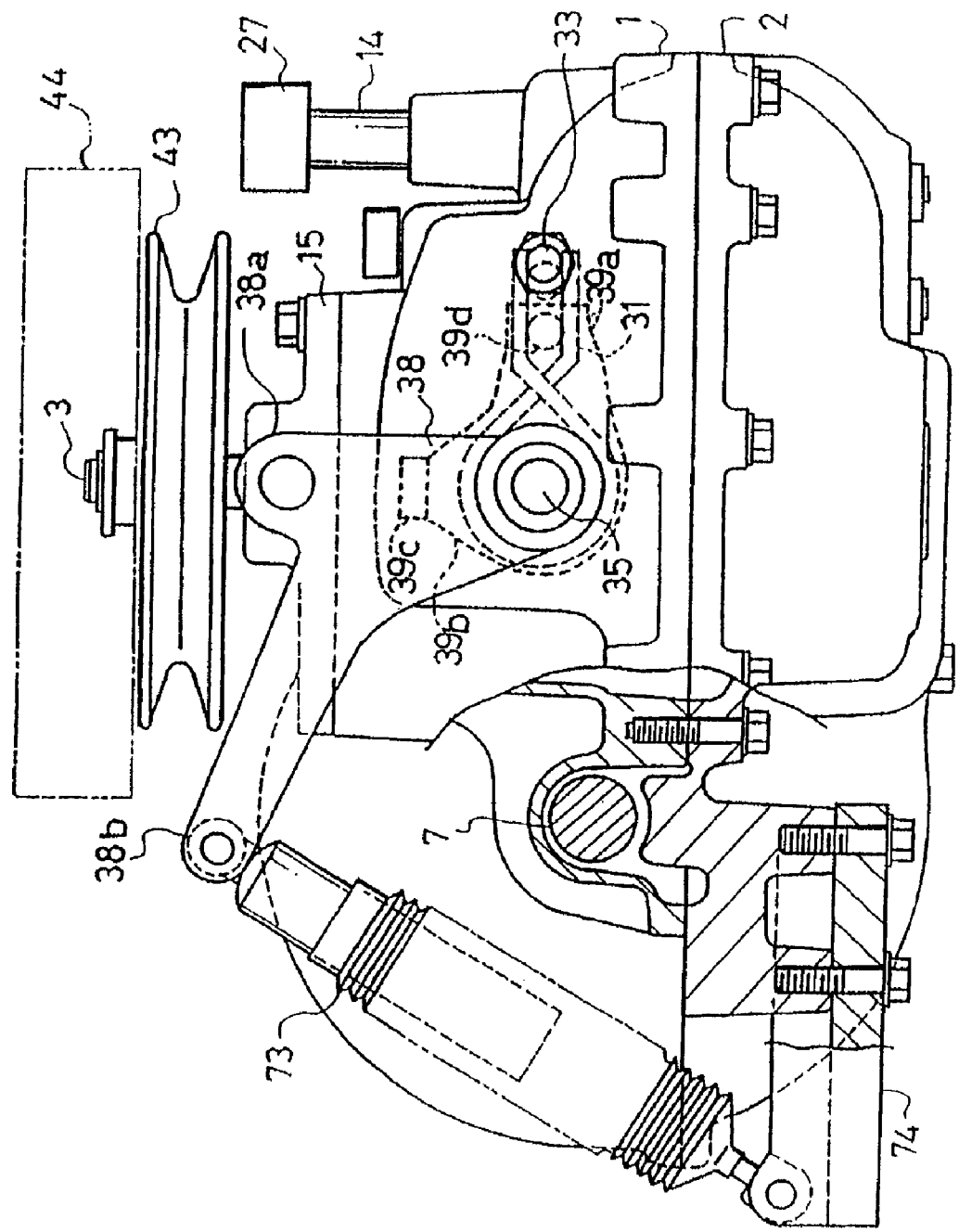
FIG. 2 is a cross-sectional view looking in the direction of the arrows 2-2 in FIG. 1.
Figure 3:
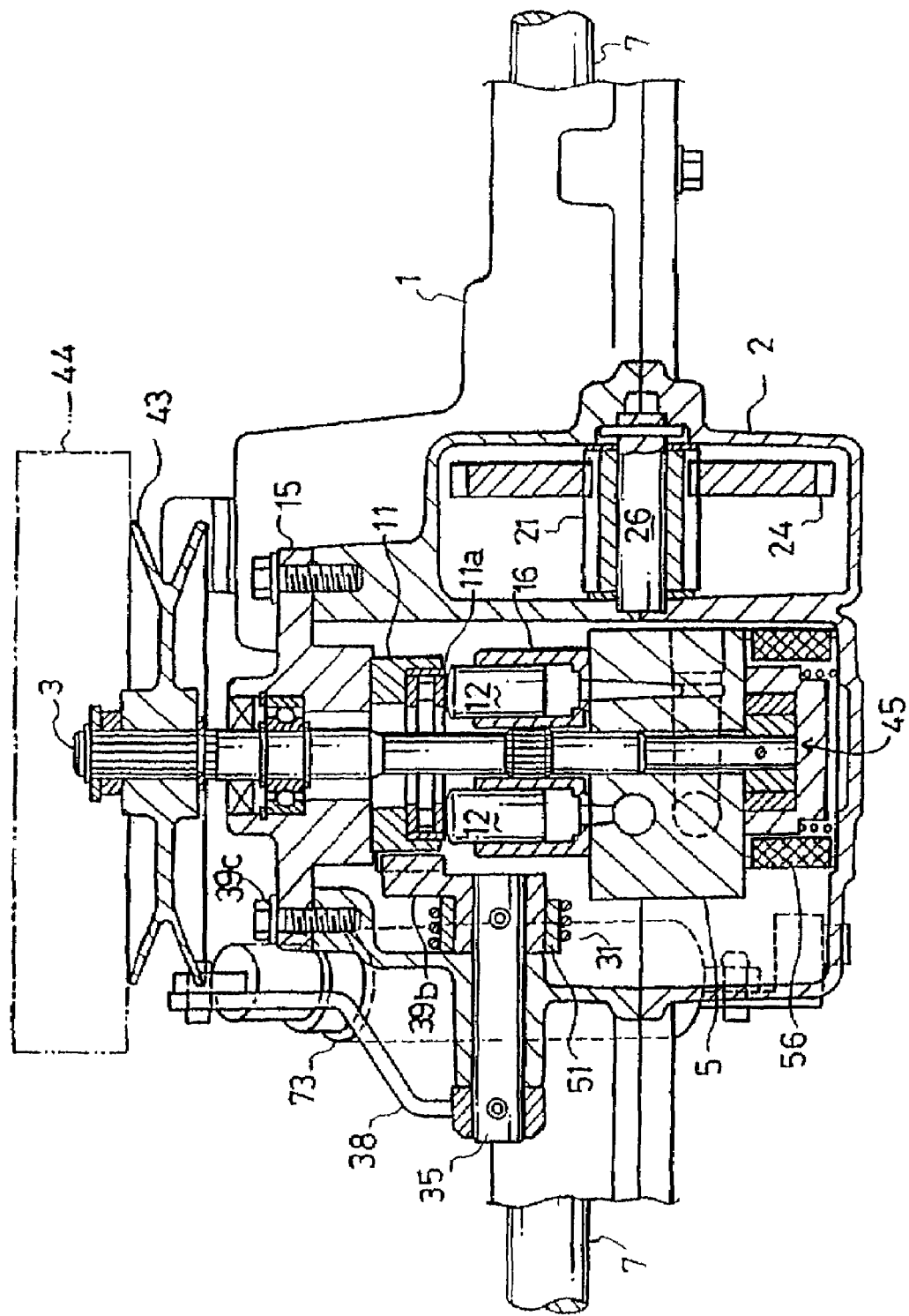
FIG. 3 is a cross-sectional view looking in the direction of the arrows 3-3 in FIG. 1.

In order to slantingly operate movable swash plate 11, as shown in FIGS. 1 and 3, a control shaft 35 extending in parallel to axles 7 is rotatably supported on the right side wall of upper half housing 1 opposite to the driving gear train for transmitting power to differential gear unit 23. A control arm 38 is mounted onto one end of control shaft 35 outwardly extending from the housing. A swinging arm 39 is mounted to the other end of the same, inside the housing. The swinging arm 39 comprises a first arm 39a and a second arm 39b which extend radially from control shaft 35. A projection 39c is provided at the utmost end of second arm 39b, as shown in FIG. 2. Since control shaft 35 coincides at the axis thereof with the axis of slanting motion of movable swash plate 11, it is possible to directly engage projection 39c with a groove lid formed on a side surface of movable swash plate 11. In such a construction, when control arm 38 is rotated longitudinally of the vehicle body, swinging arm 39 rotates longitudinally around control shaft 35 so as to enable movable swash plate 11 to be slantingly moved to thereby change the output of the hydraulic pump.

At the utmost end of first arm 39a, opposite to projection 39c, is disposed an engaging pin 39d. A bush 51 is fitted onto control shaft 35 within the housing. A neutral position return spring 31 of the torsion coil type is fitted onto bush 51. Both ends of neutral position return spring 31 cross and extend in the direction of first arm 39a so as to put between both ends an eccentric shaft 33 mounted onto an inside wall of upper half housing 1 and engaging pin 39a. Accordingly, when control arm 38 and swinging arm 39 rotate to change the speed of the vehicle, one end of neutral position return spring 31 is moved to widen a gap between both ends, but the other end of spring 31 is retained by the eccentric shaft 33, so that control lever 38 is given a biasing force to return to a neutral position. When the operating force on control arm 38 is released, a restoring force generated at one end of neutral position return spring 31 holds engaging pin 39d by eccentric shaft 33 in the specified neutral position. A portion of eccentric shaft 33 extending outwardly of the housing is formed into an adjusting screw and eccentric shaft 33 is preferably rotatably shifted therethrough, so that swinging arm 39 shifts around control shaft 35, thereby enabling movable swash plate 11 to be adjusted to put it into an accurate neutral position.

Control arm 38, as shown in FIG. 2, is provided with an arm 38b for connecting a shock absorber 73. A vertical arm 38a connects to a speed changing member (not shown), such as a lever or a pedal provided on the vehicle, through a link mechanism (not shown) on the vehicle. Arm 38b is pivotally supported by a movable member of shock absorber 73. A casing thereof is pivotally mounted onto a support plate 74 fixed to a lower surface of an axle housing portion of lower half housing 2. Shock absorber 73 prevents control arm 38 from abruptly changing speed and also prevents the speed changing member (not shown) from abruptly returning to the neutral position when operating force is released so as to exert a sudden braking action onto the HST. Also, shock absorber 73 is positioned somewhat forwardly slanted and extends along the right side wall of upper half housing 1 straddling axles 7, thereby effectively utilizing an otherwise unused or dead space surrounding axles 7.

Figure 4:
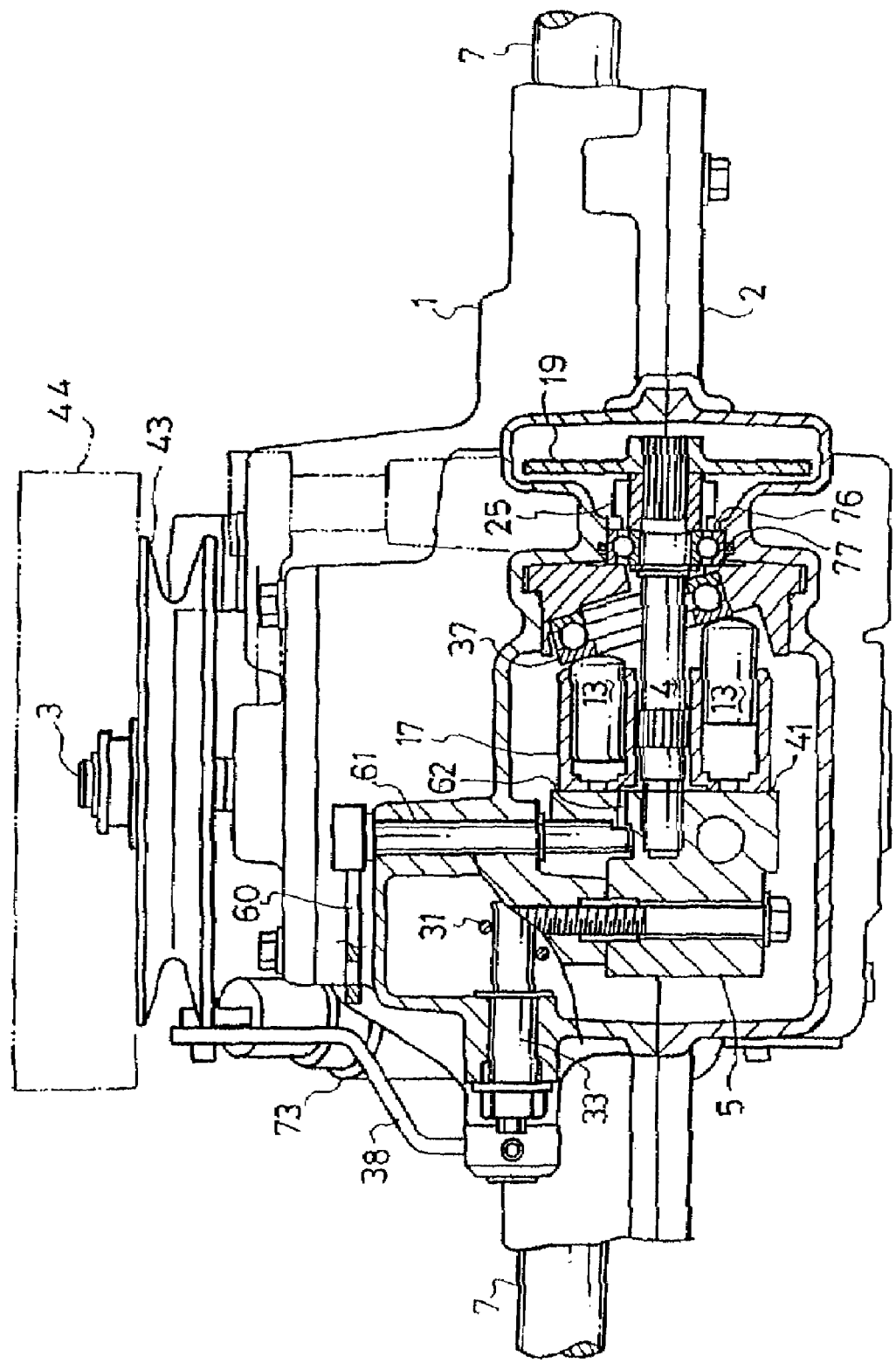
FIG. 4 is a cross-sectional view looking in the direction of the arrows 4-4 in FIG. 1.

Pressurized oil discharged from the hydraulic pump is sent to the hydraulic motor through an oil passage in center section 5. The hydraulic motor is constructed as shown in FIG. 4. In detail, a cylinder block 17 is rotatably, slidably mounted on motor mounting surface 41 formed on vertical surface 91 of center section 5. A plurality of pistons 13 are movably mounted in reciprocation in a plurality of cylinder bores in cylinder block 17, through biasing springs. The heads of pistons 13 abut against a fixed swash plate 37 which is fixedly disposed between upper half housing 1 and lower half housing 2. Motor shaft 4 is not relatively rotatably retained on the rotational axis of cylinder block 17 and extends substantially horizontally. One end of motor shaft 4 is supported in a bearing bore in motor mounting surface 41 of center section 5. The other end is supported by a bearing 76 on inner wall 8 formed along the joint surfaces of upper half housing 1 and lower half housing 2. The utmost end of motor shaft 4 enters into second chamber R2. Bearing 76 is a sealing bearing for partitioning first chamber R1 from second chamber R2. An O-ring 77 is disposed between the outer periphery of an outer ring and inner wall 8.

The driving gear train for transmitting power from motor shaft 4 to differential gear unit 23, as shown in FIGS. 1 and 6, comprises a gear 25 fixed onto motor shaft 4 where it enters into second chamber R2, a larger diameter gear 24 supported onto a counter shaft 26 and permanently engageable with gear 25, a smaller diameter gear 21 supported on counter shaft 26 and integrally rotatable with larger diameter gear 24, and ring gear 22 of differential gear unit 23 which is permanently engageable with smaller diameter gear 21. Counter shaft 26 is disposed in second chamber R2 adjacent to pump shaft 3 and perpendicular thereto. One end of counter shaft 26 is supported by a side wall of the housing at the joint surface of upper half housing 1 and lower half housing 2. The other end is supported by inner wall 8 at the joint surface thereof. The rotational output speed of motor shaft 4 is reduced by larger diameter gear 24, smaller diameter gear 21 and ring gear 22 so as to drive axles 7 through differential gear unit 23. Larger diameter gear 24 on counter shaft 26 is disposed as close as possible to the outside surface of ring gear 22 and is overlapped axially therewith, thereby reducing the longitudinal length of the housing. In this embodiment, the HST is disposed to one side of the driving gear train at the right side thereof. At a further right side thereof is disposed a speed changing mechanism for the HST. The hydraulic pump thereof is positioned substantially in the lateral and longitudinal center of the housing. Differential gear unit 23 is disposed in an enlarged portion of the housing.

A brake disc 19 is fixed on the utmost end of motor shaft 4 in second chamber R2. As shown in FIGS. 1, 15, 16 and 17, a brake pad 29 and a wedge shaped member 70 are interposed between the upper portion of the front surface of brake disc 19 and the inner surface of upper half housing 1 and are supported thereto, movable only in the direction of the rotational axis of motor shaft 4. In a space surrounded by inner wall 8 and the surface of brake disc 19 opposite to brake pad 29 (at the left side of brake disc 19 in FIG. 15), a biasing member 72 and a brake operating shaft 14 are disposed. Brake operating shaft 14 is vertically disposed and is rotatably supported by upper half housing 1 and lower half housing 2. The upper end of brake operating shaft 14 projects upwardly from the housing and has a brake arm 27 fixed thereto. On an outside surface of an intermediate portion of brake operating shaft 14 in the housing is formed a flat cutout 14a which is D-like-shaped when viewed in cross-section. Arch-like-biasing-member 72 is fitted into cutout 14a and is restricted from axial movement by cutout 14a and is guided at both sides by the inner surface of upper half housing 1 so as to be slidable only axially of motor shaft 4. Accordingly, when brake arm 27 is rotated to the left or to the right, brake operating shaft 14 is rotated. One longitudinal end of cutout 14a pushes the rear surface of biasing member 72 and brake disc 19 is interposed between brake pad 29 and biasing member 72 to exert a braking action on motor shaft 4. Wedge member 70 abuts at the lower surface thereof against the upper end of an adjusting bolt 71. Adjusting bolt 71 screws into lower half housing 2 and projects outwardly from lower half housing 2, thereby screwably tightening a lock nut at the intermediate portion of bolt 71 for locking wedge member 70. Wedge member 70 is raised or lowered in the housing as adjusting bolt 71 is rotated so as to advance or retract in the direction of the rotational axis of motor shaft 4. As brake pad 29 is worn, the interval between brake pad 29 and brake disc 19 can be properly maintained by adjusting bolt 71 which is vertically disposed in lower half housing 2.

Next, explanation will be given on the construction of center section 5 in accordance with FIGS. 7 through 14. Center section 5 is larger longitudinally than conventional center sections. Center section 5 has three bolt bores 5h which are open vertically between a front portion of center section 5 and a rear portion thereof. Center section 5 is fixed to upper half housing 1 through bolts. At the center of pump mounting surface 40 formed on horizontal surface 90 on an upper surface of a rear portion of center section 5 is formed a bearing portion so as to enable the lower portion of vertical pump shaft 3 to be rotatably supported therewith. Pump shaft 3 is perpendicularly disposed with respect to axles 7. A pair of arcuate ports 40a and 40b are open at both sides of the bearing for supplying and for discharging oil from cylinder block 16.

Figure 8:
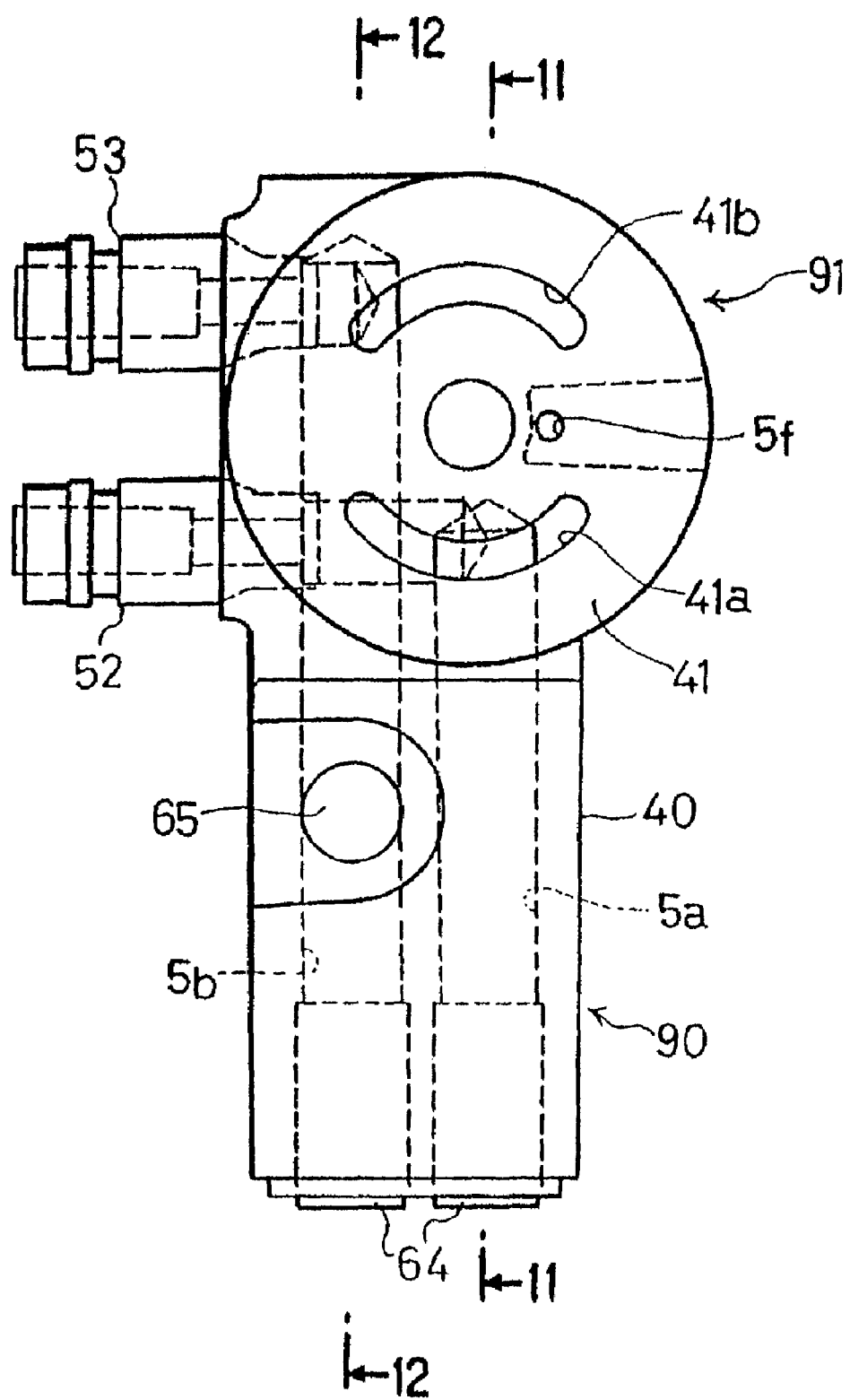
FIG. 8 is a side elevational view of the same.

At the front portion of horizontal surface 90 is formed a vertical surface 91, a phantom plane which includes vertical surface 91 crosses near the longitudinal axis of pump shaft 3. Center section 5 is substantially L-like-shaped when viewed in cross section. As shown in FIG. 8, a pair of arcuate ports 41a and 41b are also vertically open on motor mounting surface 41 formed on front vertical surface 91, so that oil is adapted to be supplied to or discharged from cylinder block 16 through ports 41a and 41b. At the center of motor mounting surface 41 is provided a bearing for motor shaft 4 which is disposed in parallel to axles 7.

In order to connect arcuate ports 40a and 40b on pump mounting surface 40 with arcuate ports 41a and 41b on motor mounting surface 41, a first linear oil passage 5a and a second oil passage 5b are vertically and forwardly bored in a thick portion of center section 5 so as to reduce the lateral length of center section 5.

Figure 14:
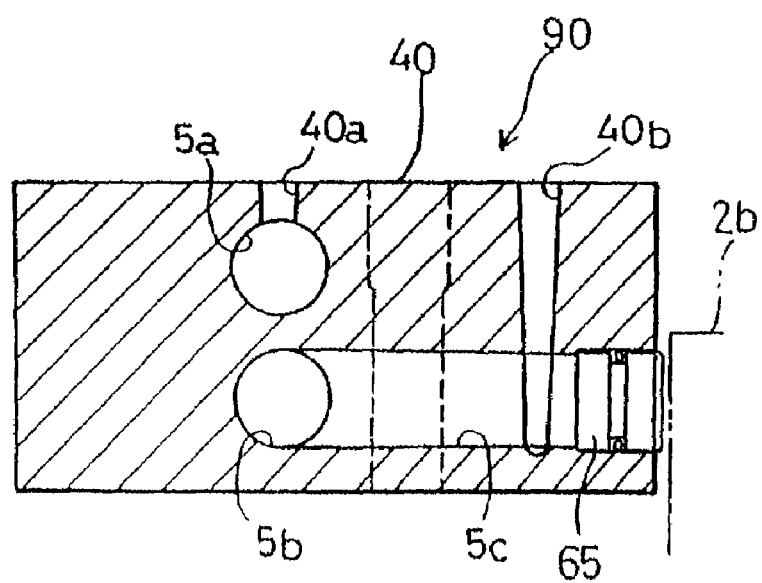
FIG. 14 is a cross-sectional view looking in the direction of the arrows 14-14 in FIG. 7.
Figure 15:
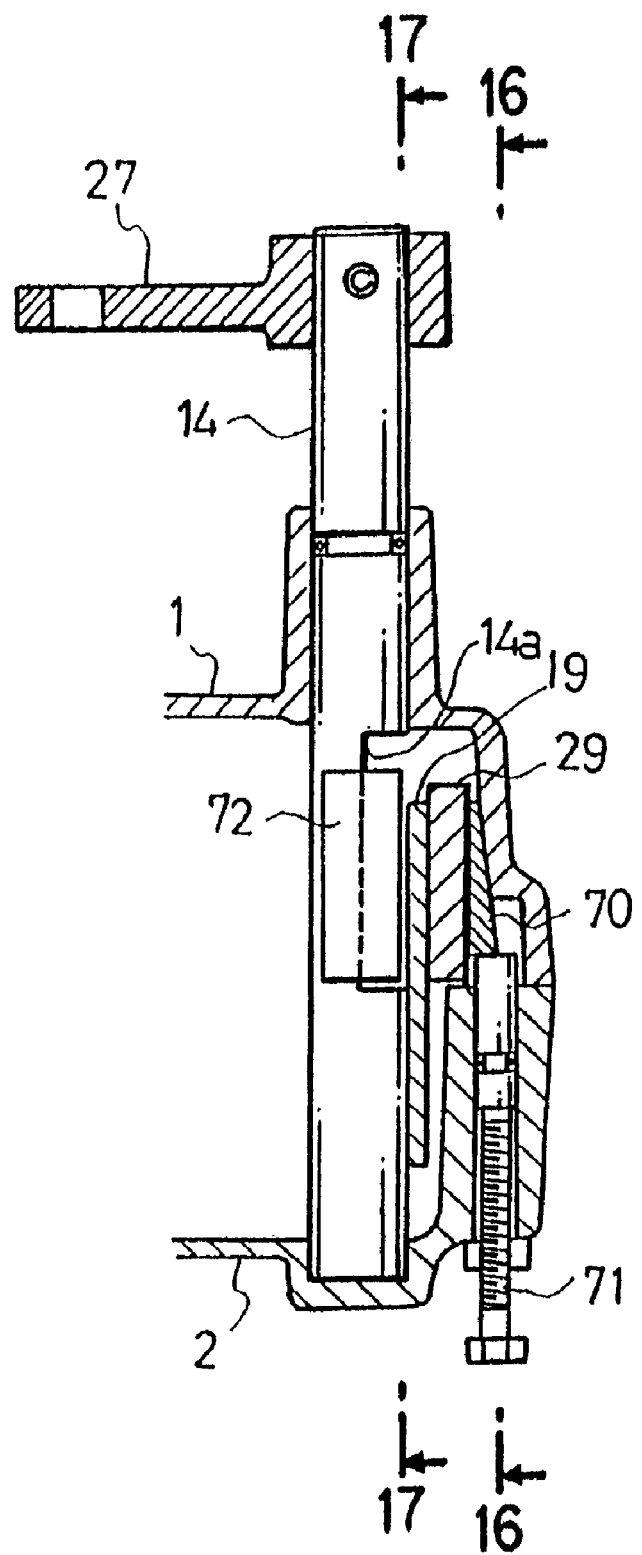
FIG. 15 is a cross-sectional rear view of a portion of the present invention surrounding a brake operating shaft.
Figure 16:
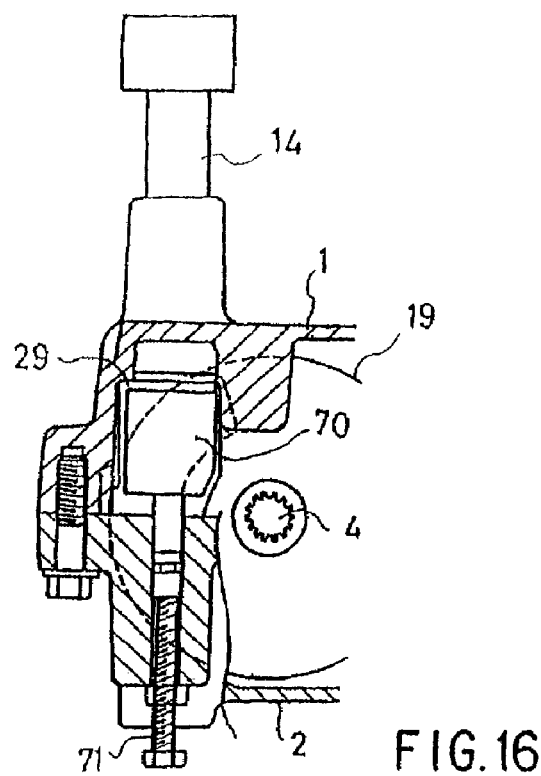
FIG. 16 is a cross-sectional view looking in the direction of the arrows 16-16 in FIG. 15.
Figure 17:
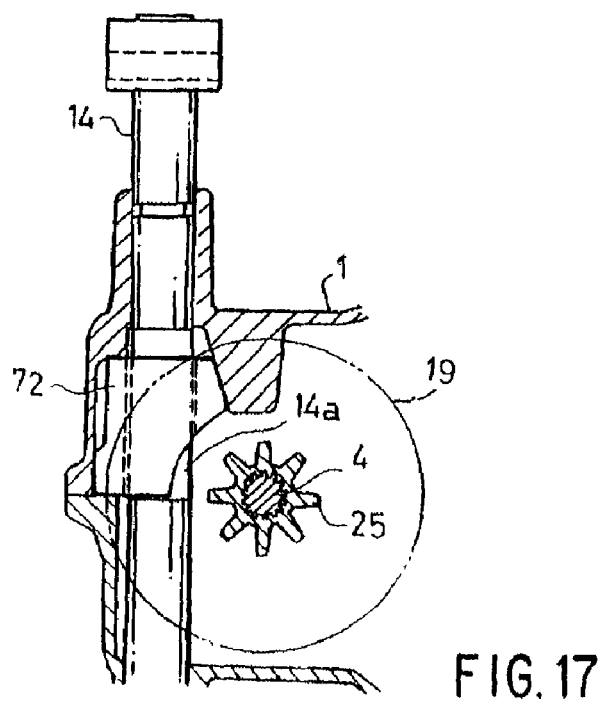
FIG. 17 is a cross-sectional view looking in the direction of the arrows 17-17 in FIG. 15.
Figure 18:
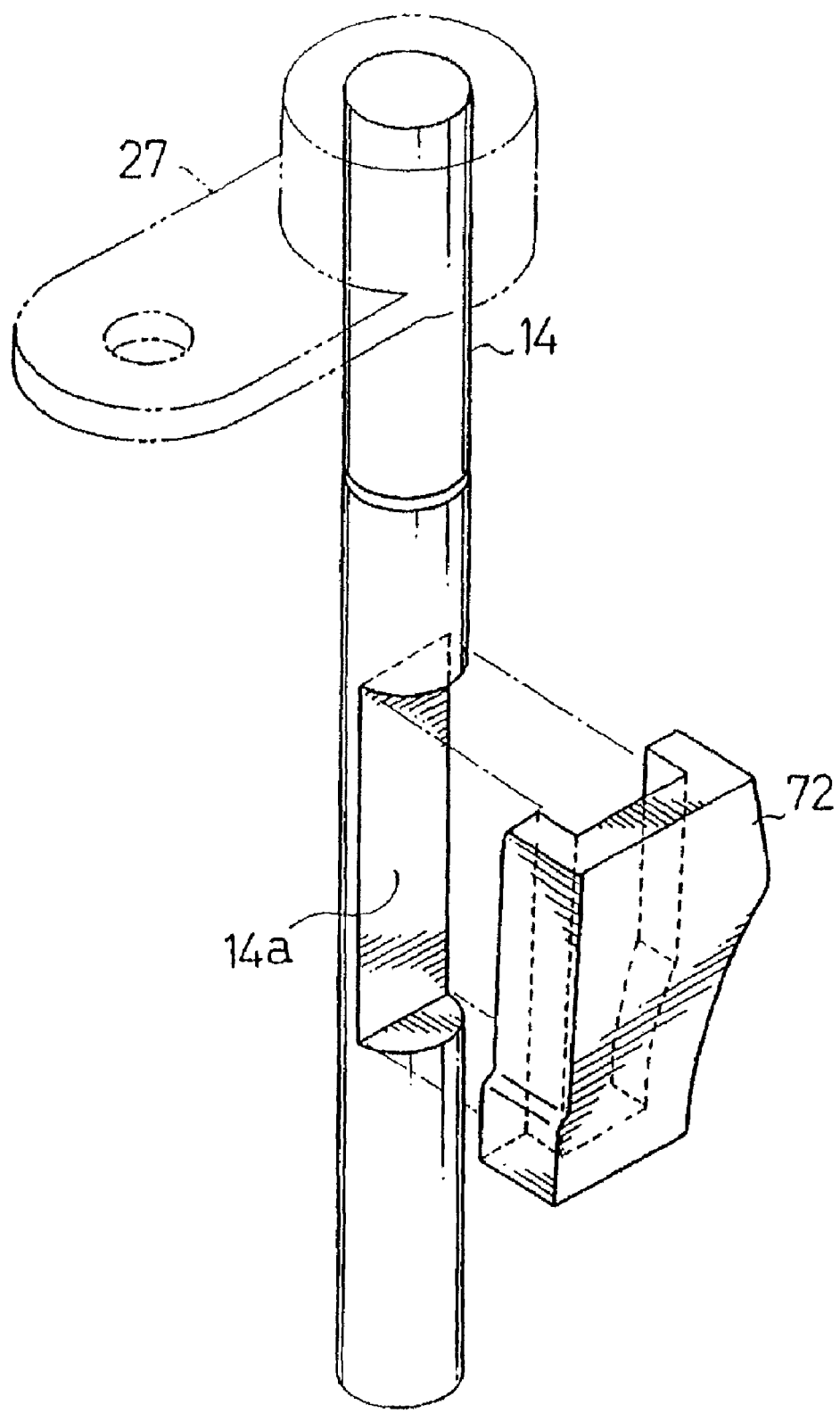
FIG. 18 is a perspective view of the brake operating shaft and a biasing member of the present invention.
Figure 19:
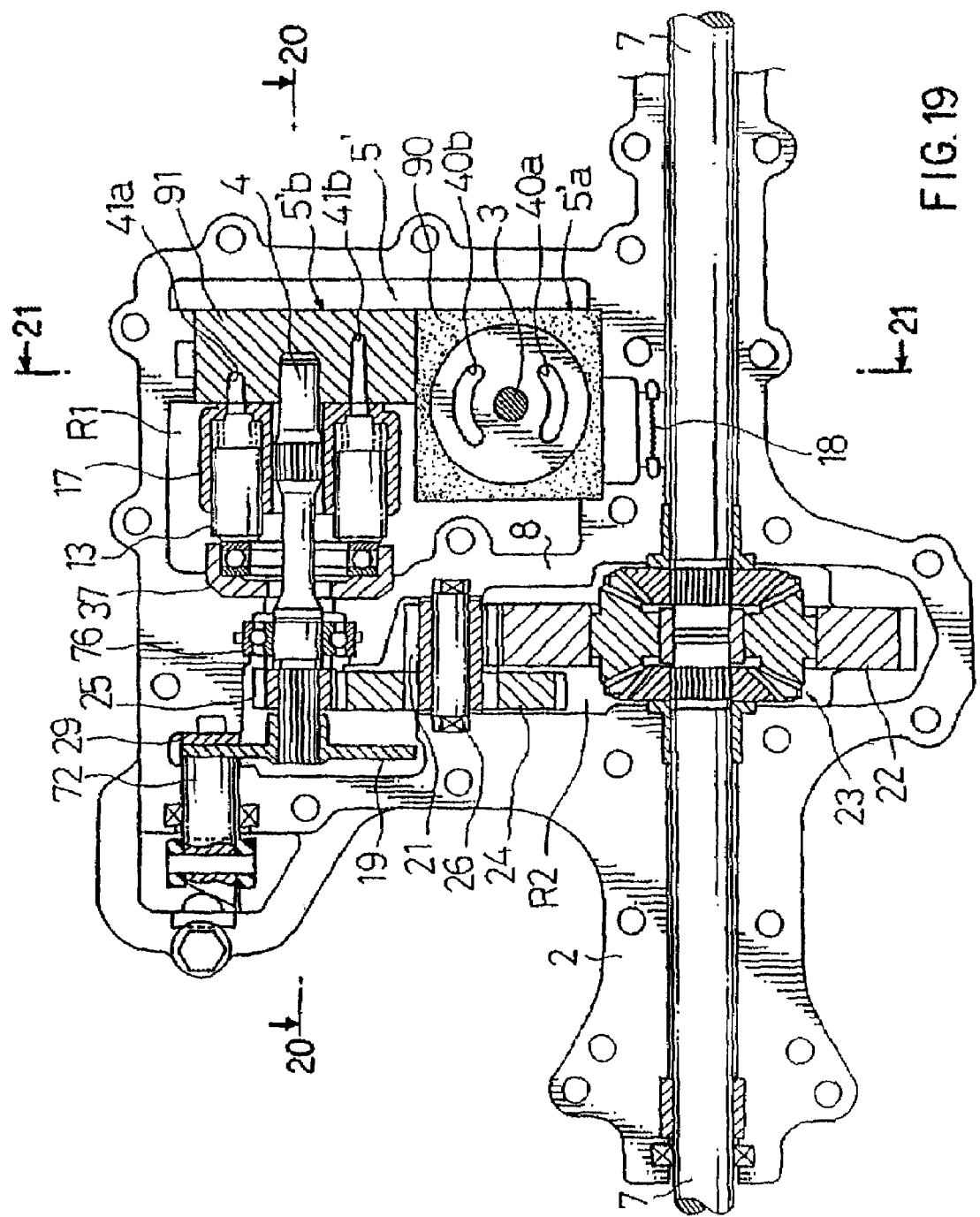
FIG. 19 is a plan view of a second embodiment of the axle driving system of the present invention from which an upper half housing is removed.
Figure 20:
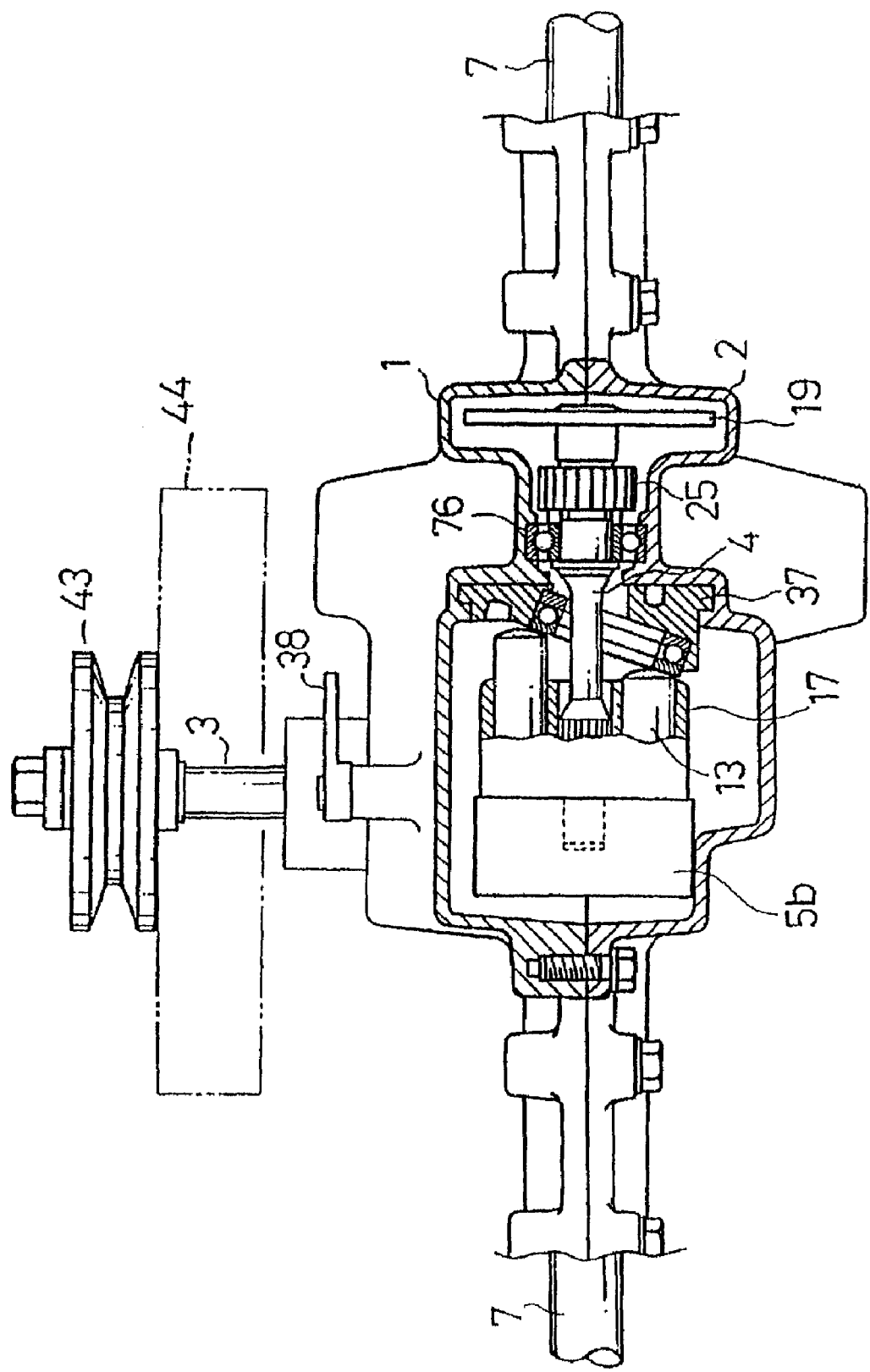
FIG. 20 is a cross-sectional view looking in the direction of the arrows 20-20 in FIG. 19.
Figure 21:
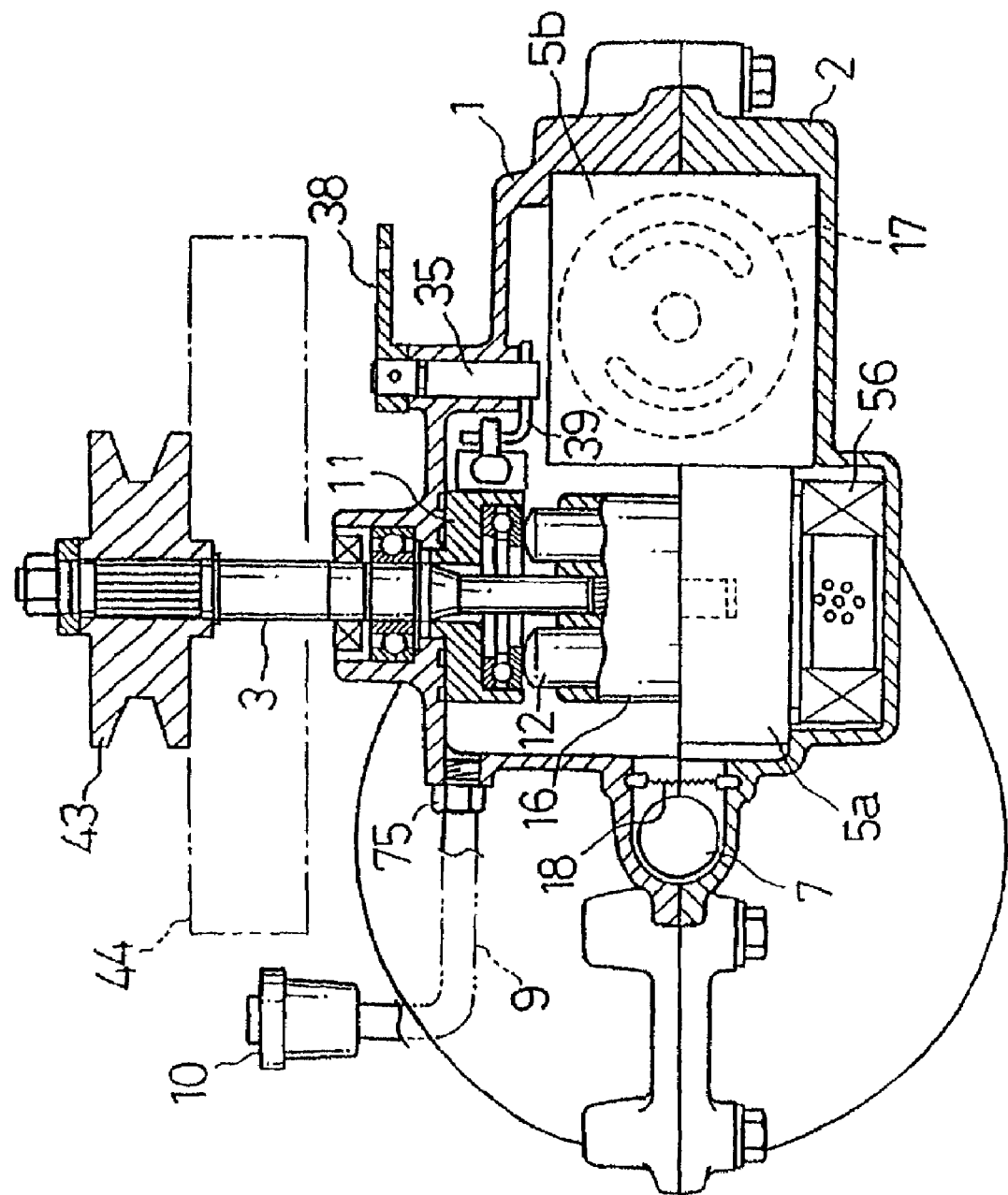
FIG. 21 is a sectional view looking in the direction of the arrows 21-21 in FIG. 19.
Figure 22:
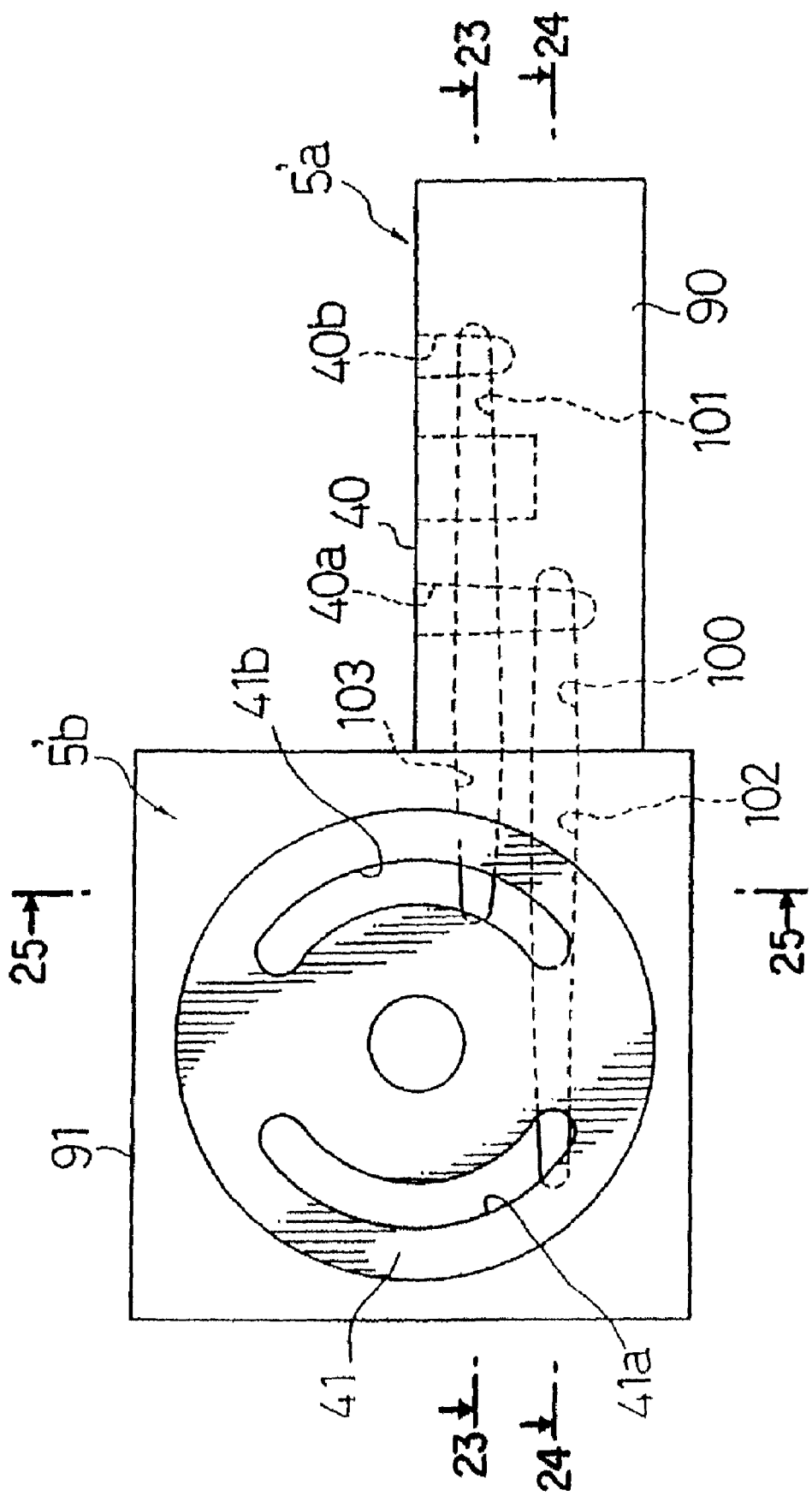
FIG. 22 is a side view of an alternative embodiment of the center section of the present invention.
Figure 23:
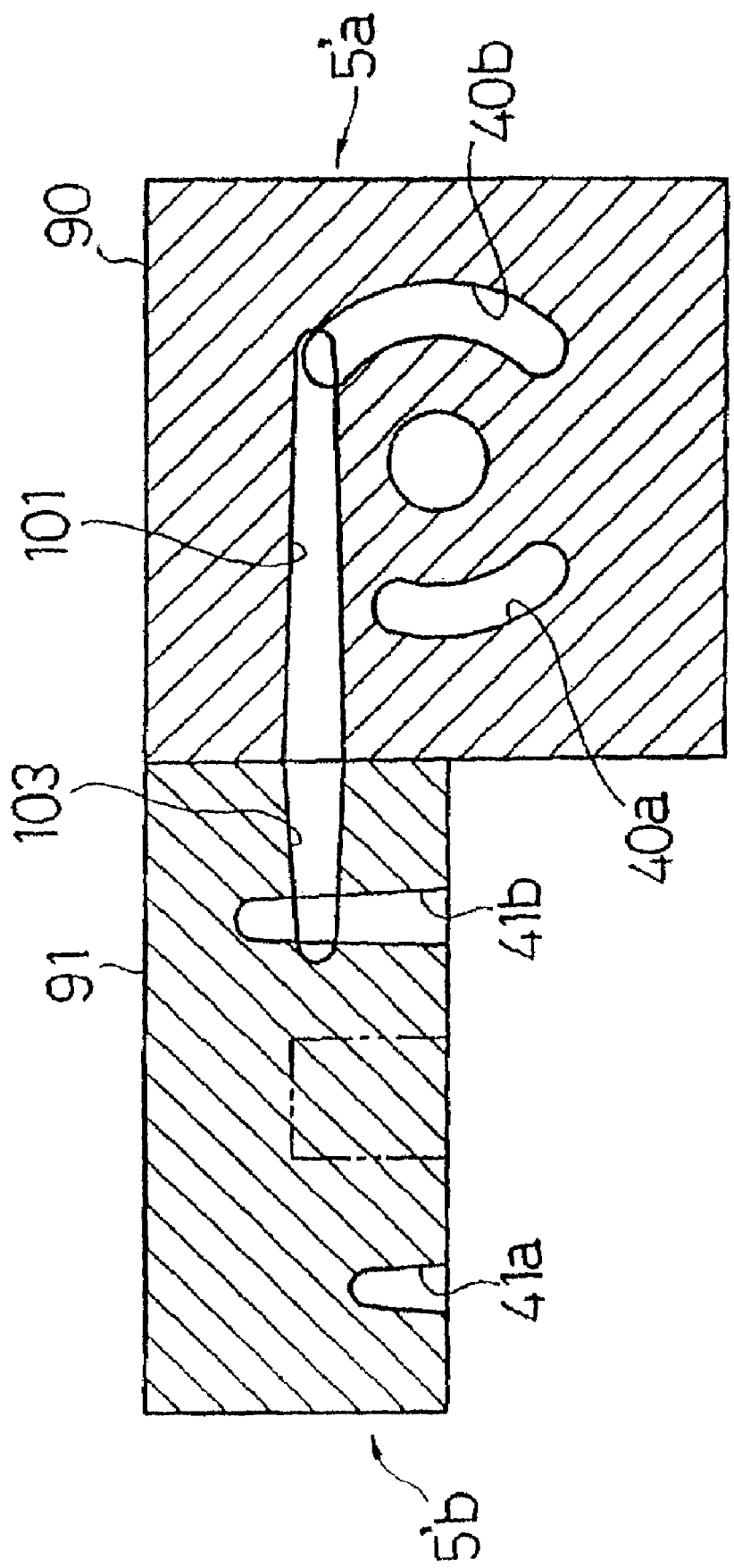
FIG. 23 is cross-sectional view looking in the direction of the arrows 23-23 in FIG. 22.
Figure 24:
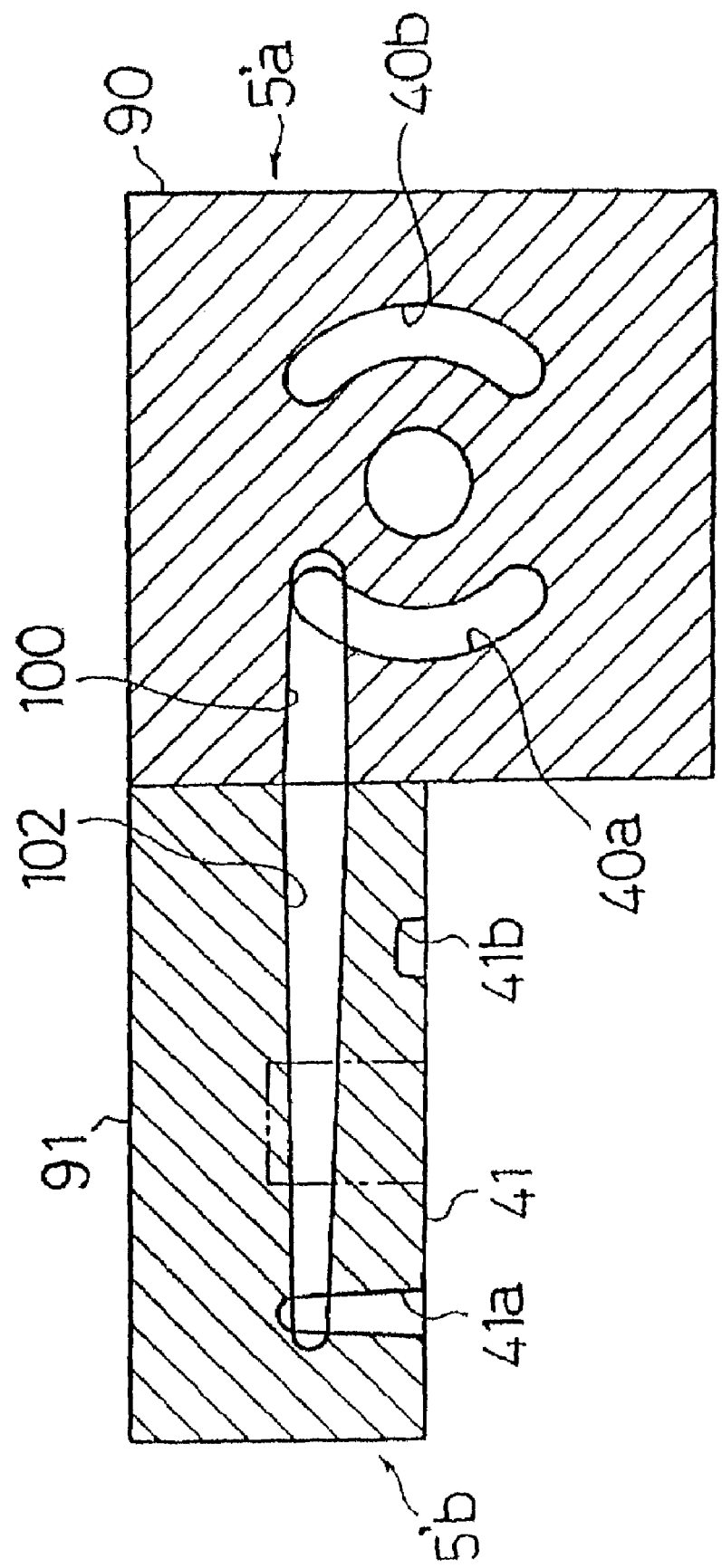
FIG. 24 is a cross-sectional view looking in the direction of the arrows 24-24 in FIG. 22.
Figure 25:
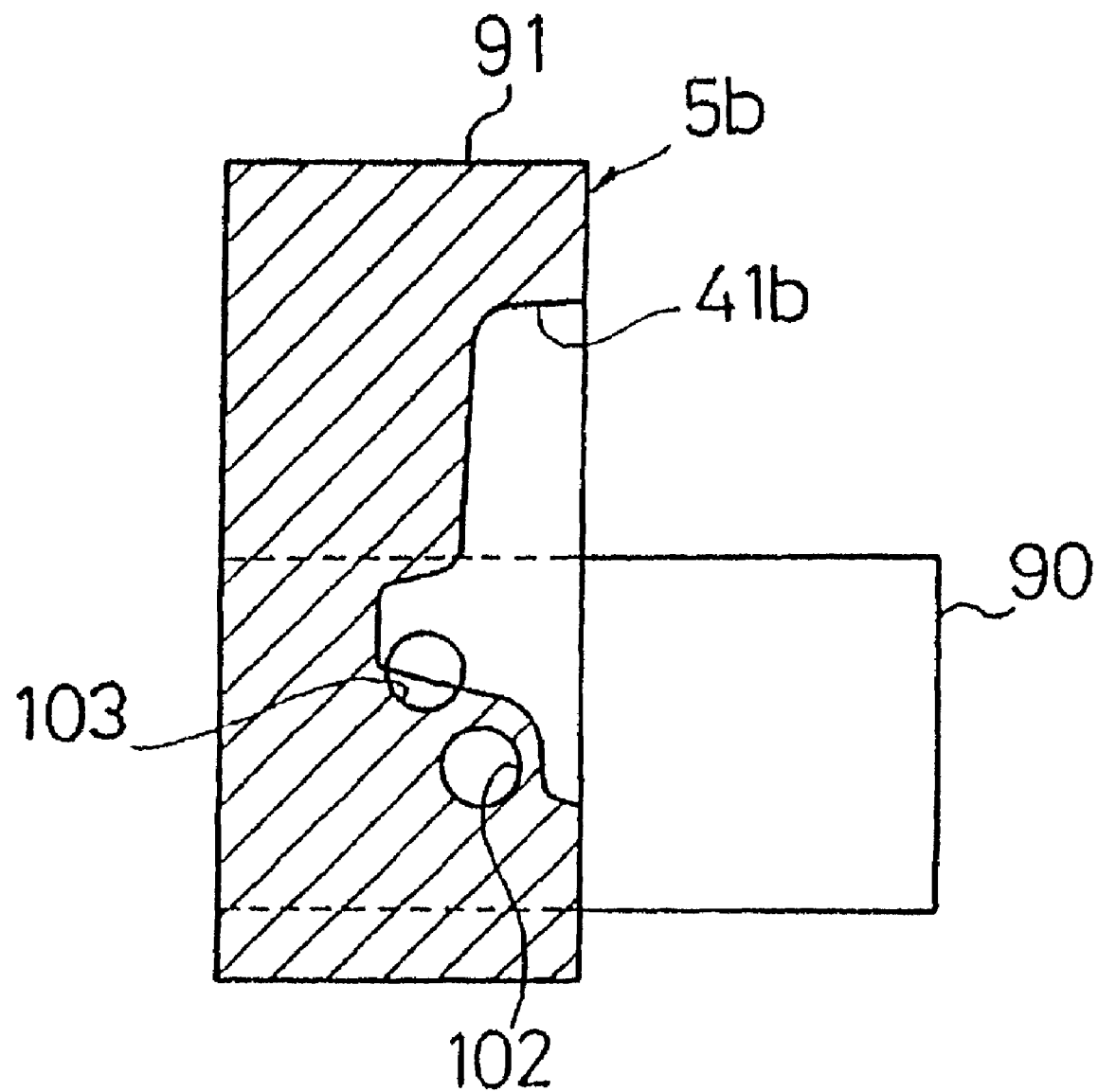
FIG. 25 is a cross-sectional view looking in the direction of the arrows 25-25 in FIG. 22.

Motor mounting surface 41 is positioned in front of the substantial center of pump mounting surface 40 so as not to increase the lateral length of the HST when the hydraulic motor is disposed thereon. A third linear oil passage 5c crosses and communicates with an intermediate portion of second linear oil passage 5b. Arcuate port 40a on pump mounting surface 40 is, as shown in FIG. 14, made thinner to communicate with first linear oil passage 5a. Arcuate port 40b is made deeper to communicate with third linear oil passage 5c. Arcuate port 41a at the upper portion of motor mounting surface 41 communicates with first linear oil passage 5a. Arcuate port 41b at the lower portion of the same communicates with second linear oil passage 5b. Second linear oil passage 5b communicates with third linear oil passage 5c, whereby arcuate ports 40a, 41a, 40b and 41b communicate to form a closed fluid circuit so as to circulate operating oil between the hydraulic pump and the hydraulic motor.

Figure 9:
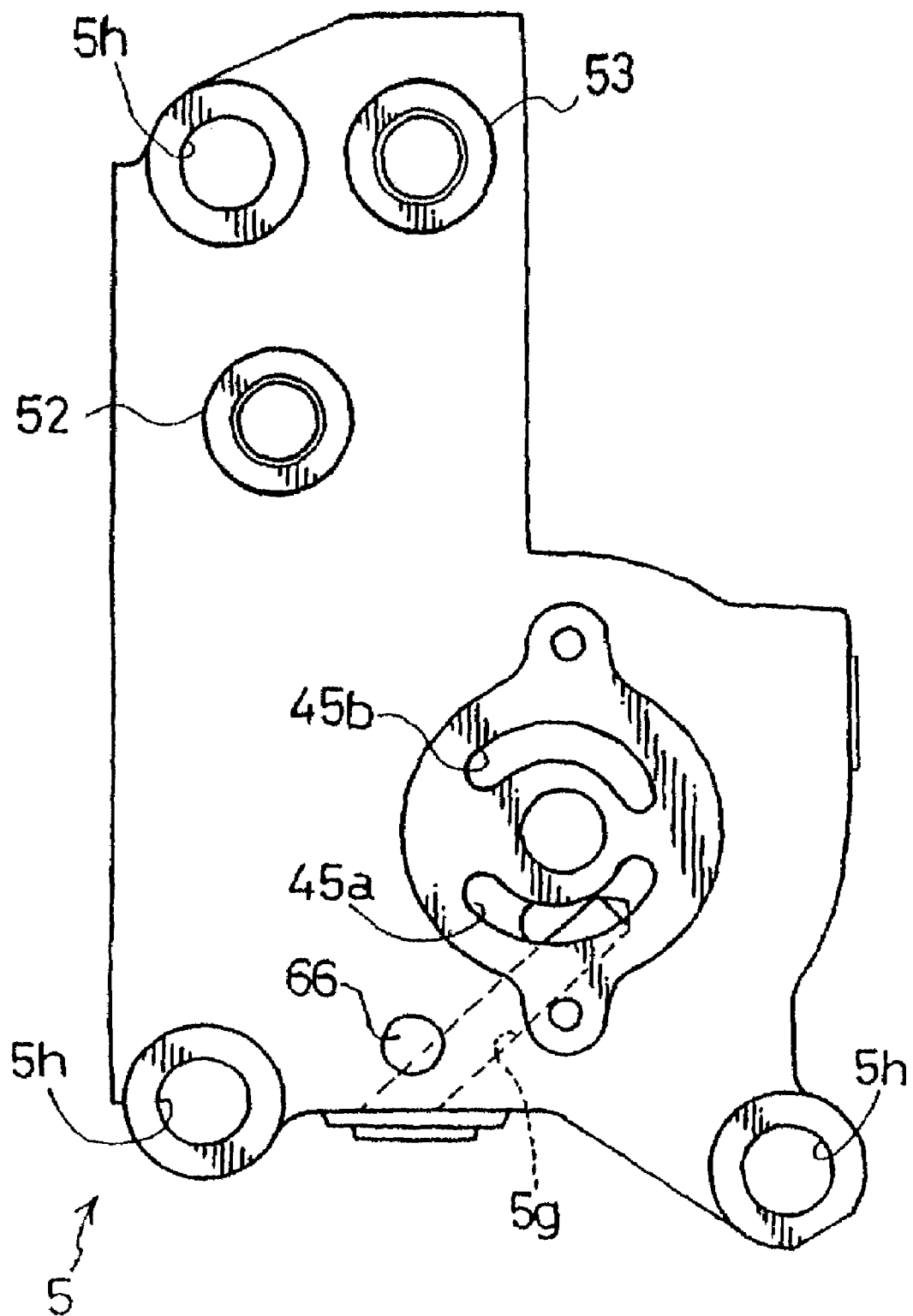
FIG. 9 is a bottom plan view of the same.
Figure 10:
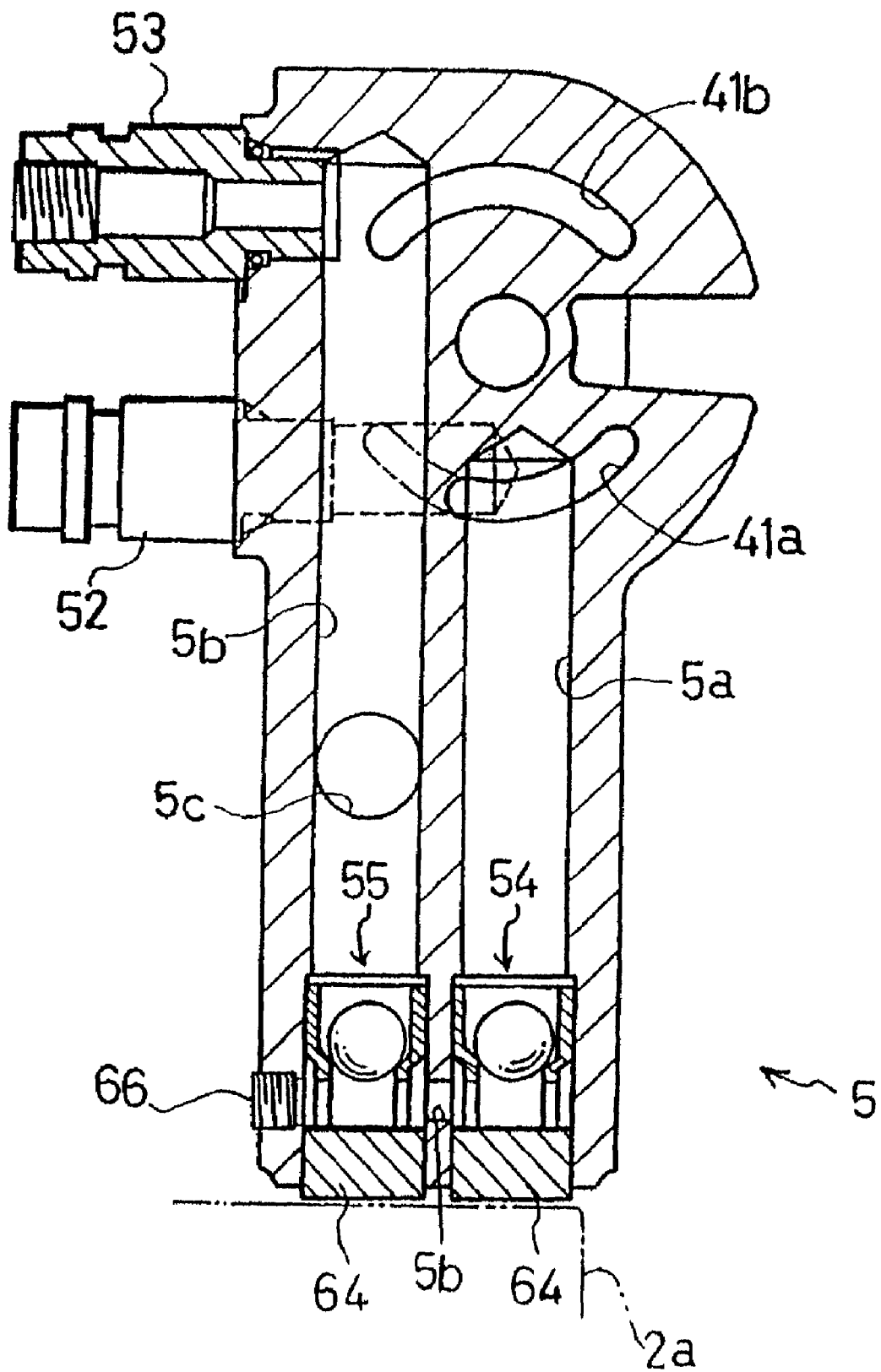
FIG. 10 is a cross-sectional view looking in the direction of the arrows 10-10 in FIG. 7.
Figure 11:
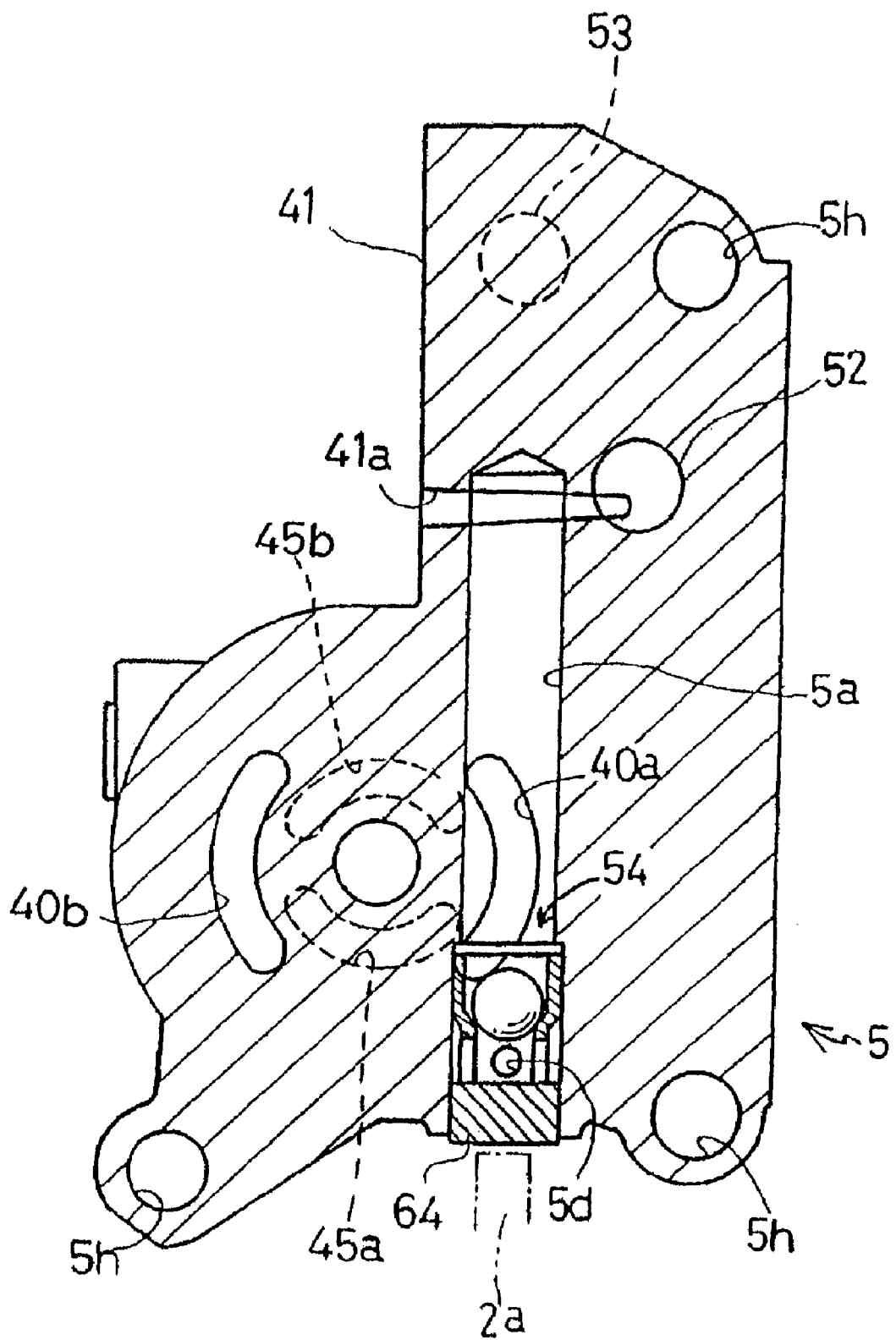
FIG. 11 is a cross-sectional view looking in the direction of the arrows 11-11 in FIG. 8.
Figure 12:
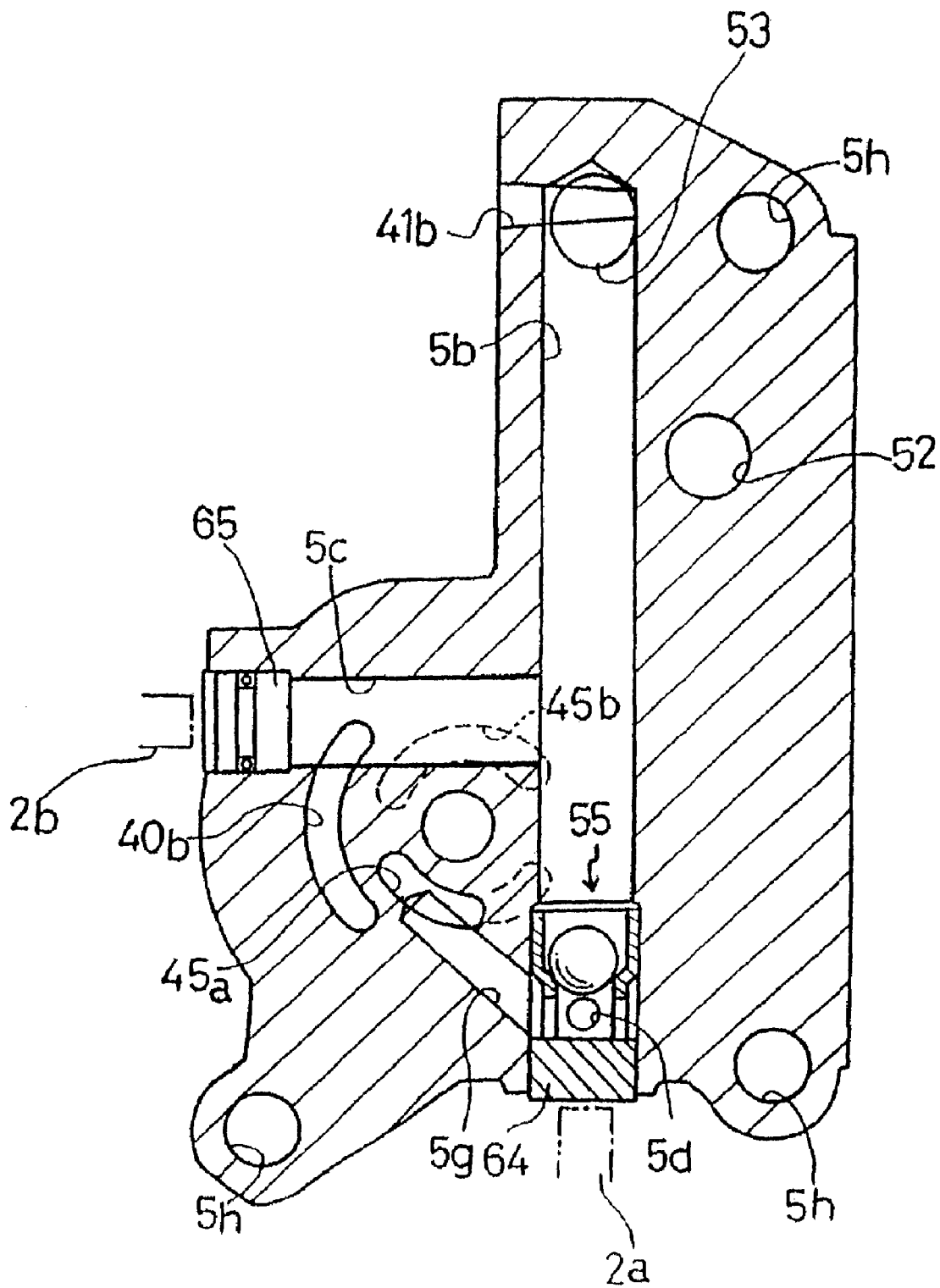
FIG. 12 is a cross-sectional view looking in the direction of the arrows 12-12 in FIG. 8.

Check valves 54 and 55 are disposed at the open ends of first linear oil passage 5a and second linear oil passage 5b and are closed with lids 64, as shown in FIG. 10. A lid 65 closes the open end of third linear oil passage 5c. When subjected to pressure, lids 64 and 65 abut against projections 2a and 2b formed on the inner wall of lower half housing 2. A first communication oil passage 5d is vertically bored in center section 5 so as to communicate with inlet ports of check valves 54 and 55. Oil passage 5d communicates with a terminal end of a second communication oil passage 5g which is horizontally bored in center section 5. A fore end of second communication oil passage 5g communicates with an inlet port 45a into which discharged oil from a charging pump 45 is guided, as shown in FIG. 12. A plug 66, as shown in FIG. 9, closes the open end of first communication oil passage 5d.

Charge pump 45, as shown in FIG. 3, comprises a pump casing which has internal teeth for retaining the lower end of pump shaft 3 extending from, the horizontal lower surface of center section 5 and external teeth engageable with the internal teeth and which is brought into close contact with the horizontal lower surface of center section 5. The pump casing is biased upwardly by a spring interposed between the lower surface of the pump casing and the inner bottom surface of lower half housing 2 and serving also as a relief valve for maintaining a specified value of pressure of oil discharged from charge pump 45 and filled in the closed fluid circuit. An annular oil filter 56 is disposed between the inner bottom surface of lower half housing 2 and the horizontal lower surface of center section 5 in a manner of surrounding charge pump 45, thereby filtering operating oil taken therein.

Figure 13:
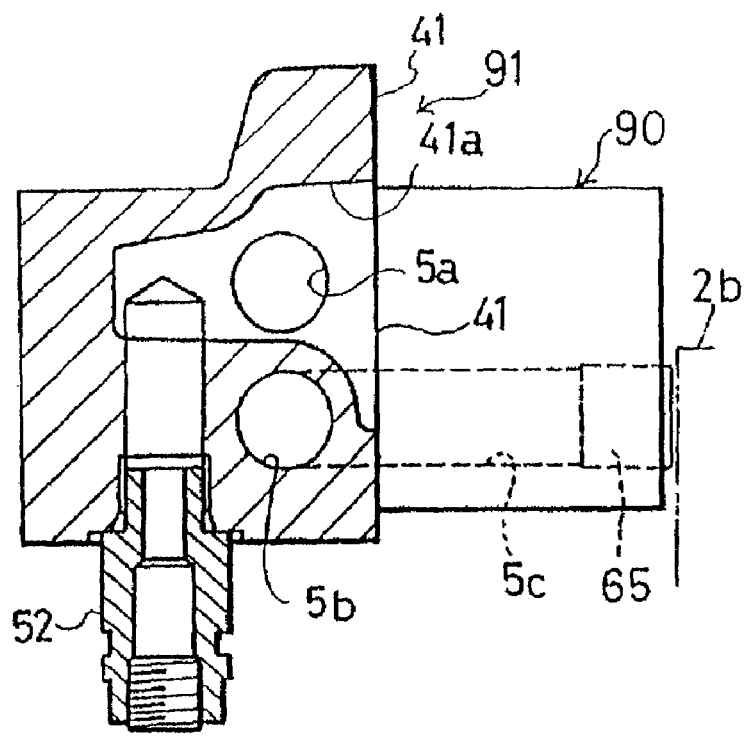
FIG. 13 is a cross-sectional view looking in the direction of the arrows 13-13 in FIG. 7.

As shown in FIGS. 5, 10 and 13, in order to fill the closed fluid circuit with operating oil after the axle driving system is assembled, oiling pipes 52 and 53 are disposed on the horizontal lower surface of center section 5. Oiling pipe 52 communicates with the deep portion of arcuate port 41a through an oil passage vertically bored from the horizontal lower surface of center section 5. Oiling pipe 53 directly communicates with second linear oil passage 5b. Oiling pipes 52 and 53 are exposed at the lower ends thereof from the lower outer surface of lower half housing 2 and are closed by lids after the closed fluid circuit is filled with operating oil.

A by-pass operating arm 60, as shown in FIG. 5, is disposed above upper half housing 1 so as to open first and second linear oil passages 5a and 5b into the oil sump for idling axles 7 when hauling the vehicle. In detail, as shown in FIGS. 1 and 4, by-pass operating arm 60 is fixed at the base thereof to a by-pass shaft 61 vertically, pivotally supported to an upper wall of upper half housing 1. Bypass shaft 61 extends at the lower end thereof toward the surface of center section 5 opposite to motor mounting surface 41 and forms a flat surface at the periphery of the lower portion.

A through bore 5f (see FIG. 8) is open on motor mounting surface 41 of center section 5 and is slightly above the center thereof and between accurate ports 41a and 41b. A push pin 62 is slidably supported by center section 5 in the direction of rotation of the axis of cylinder block 17. Push pin 62 can at one end abut against a rotatably slidable surface of cylinder block 17 which comes into close contact with motor mounting surface 41, and abuts at the other end against flat surface 61a of by-pass lever shaft 61.

When the vehicle is hauled, an operator operates by-pass operating arm 60 outside of the housing causing by-pass shaft 61 to rotate. Flat surface 61a pushes push pin 62 toward cylinder block 17. Push pin 62 releases cylinder block 17 from motor mounting surface 41, and the closed fluid circuit communicates with the oil sump in the housing through arcuate ports 41a and 41b, thereby obtaining free rotation of motor shaft 4.

Next, explanation will be given on a second embodiment of the present invention in accordance with FIGS. 19 through 25, in which similar parts have been given the same reference numerals as used in the description of the first embodiment. In the second embodiment, the center section is formed in two pieces rather than in one piece as is center section 5 in the first embodiment. In this embodiment, center section 5' is formed of a first piece 5'a and a second piece 5'b which are coupled together. On horizontal surface 90 of first piece 5'a is formed pump mounting surface 40. A pair of kidney-shaped ports 40a and 40b are open on pump mounting surface 40. On a side surface of a vertical portion 91 of second piece 5'b is formed motor mounting surface 40, on which a pair of kidney-shaped bores 41a and 41b are open. Communicating oil passages 100 and 101 are bored in first piece 5'a. The terminal ends thereof are open on the side surface. Inside second piece 5'b are bored oil passages 102 and 103 which communicate with the pair of kidney-shaped ports 41a and 41b. The terminal ends of the passages 102 and 103 are open on the side surface. Oil passages 100 and 102, 101 and 103 connect with each other through the joint surfaces when horizontal portion 90 is coupled with vertical portion 91, thereby forming a closed fluid circuit for circulating therein operating oil between the hydraulic pump and hydraulic motor.

Center section 5' is not provided with bolt insertion bores 5h as shown in the first embodiment, but is sandwiched between upper half housing 1 and lower half housing 2 so as to be restrained from vertical and lateral movements, thereby being fixedly, positioned in the housing.

The advantages of a two-piece center section 5' include that the manufacturing and processing costs and the number of assembly processes are reduced, which reduces the overall cost of the system. Further, fewer parts are required in that bolts for securing the center section in the housing are not required.

When oil leaks caused from the closed fluid circuit in center section 5', oil in first chamber R1 is taken into the closed fluid circuit through oil filter 56 and check valves (not shown). In this embodiment, control shaft 35 for slantingly. rotating swash plate 11 of the hydraulic pump is vertically and rotatably supported by an upper wall of upper half housing 1. Such construction for engaging control shaft 35 with swash plate 11 is the same as, for example, that described in U.S. Pat. No. 5,495,712 which is incorporated herein by reference thereto in its entirety.

As seen from the above description, the axle driving system of the present invention can be applied to drive the axles of a vehicle so as to sufficiently reduce the mounting space thereof. Vehicles on which this axle driving system may be used include agricultural working vehicles such as lawn and garden tractors, and transportation vehicles.

Although several embodiments have been shown and described, they are merely exemplary of the invention and are not to be constructed as limiting the scope of the invention which is defined by the appended claims.

What is claimed is:

1. A transaxle comprising:
   a housing;
   a first axle supported by the housing;
   a hydraulic pump disposed in the housing, the hydraulic pump including a pump shaft and a movable swash plate;
   a control shaft supported by the housing so as to control the movable swash plate;
   a hydraulic motor disposed in the housing, the hydraulic motor including a motor shaft for driving the axle;
   a center section disposed in the housing so as to fluidly connect the hydraulic pump to the hydraulic motor, wherein the center section defines positions of the hydraulic pump and motor in the housing so that the motor shaft is disposed perpendicular to the pump shaft and in parallel to the axle, and that the hydraulic pump is nearer to the axle than the hydraulic motor;
   an intermediate shaft in the housing; and
   an intermediate gear provided on the intermediate shaft so as to transmit power from the motor shaft to the axle, wherein, when viewed in plan, the control shaft and the intermediate shaft are disposed opposite to each other with respect to the hydraulic pump therebetween so that the control shaft, the hydraulic pump and the intermediate shaft are linearly aligned, and wherein, when viewed in front, the control shaft is higher than the axle, and the intermediate shaft is lower than the axle.

2. The transaxle according to claim 1, the hydraulic motor including a cylinder block engaging with the motor shaft, and the cylinder block being fitted onto a motor mounting surface of the center section, further comprising:
   a bypass shaft adapted for separating the cylinder block from the motor mounting surface, wherein the bypass shaft is extended in parallel to the pump shaft and is disposed on the housing opposite to the axle with respect to the hydraulic pump.

3. The transaxle according to claim 1, further comprising:
   a second axle supported by the housing and differentially connected to the first axle.

* * * * *